Oct. 12, 1948.
D. S. BENNETCH
2,451,058
SEMIAUTOMATIC AUTOMOTIVE TRANSMISSION WITH
GOVERNOR-SYNCHRONIZED GEARS
Filed July 6, 1939
14 Sheets-Sheet 3
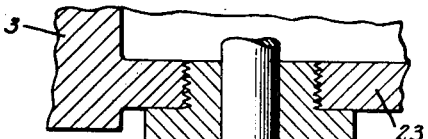
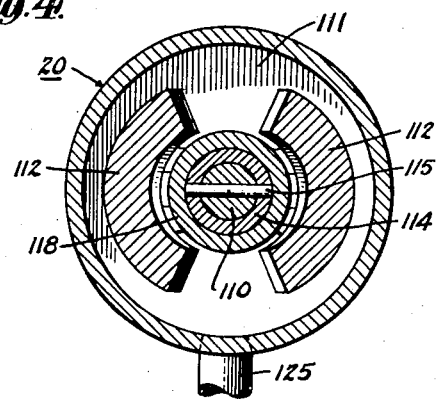
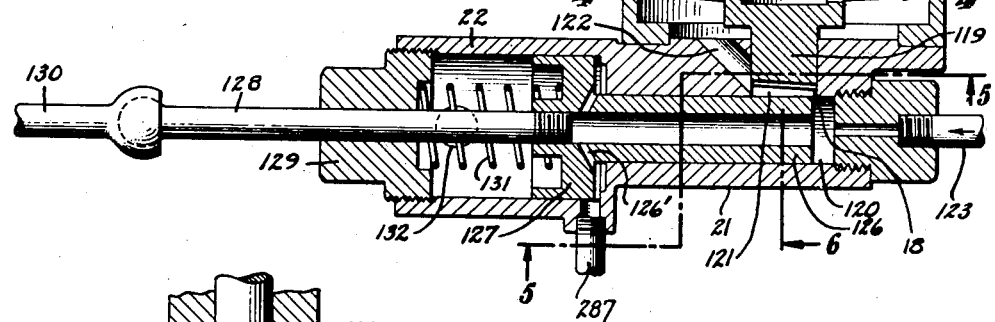
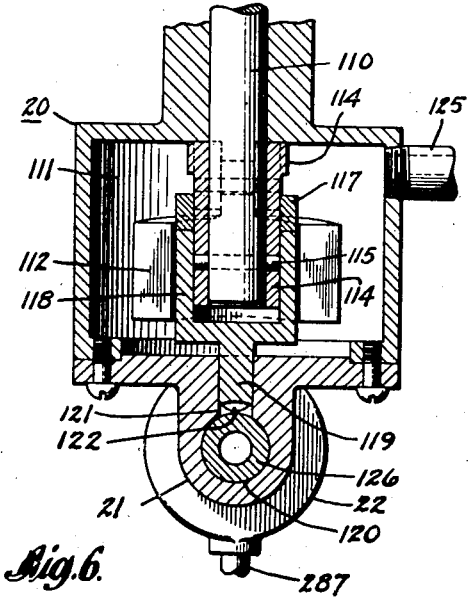
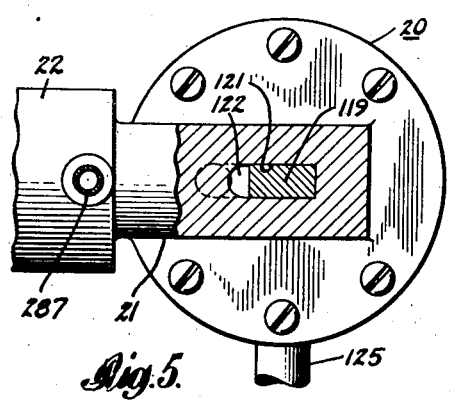
INVENTOR
David S. Bennetch
BY
Albert M. Austin
ATTORNEY

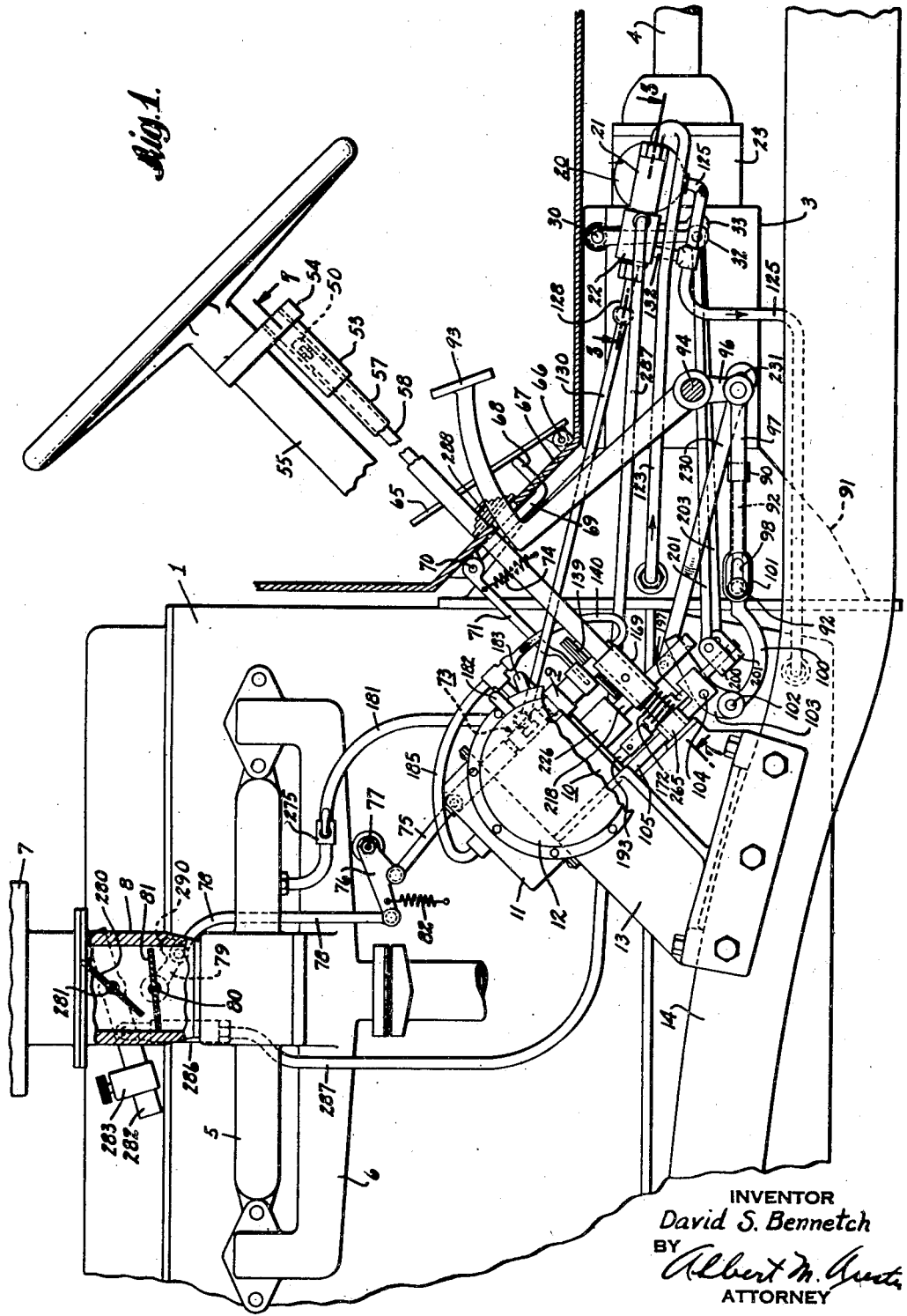

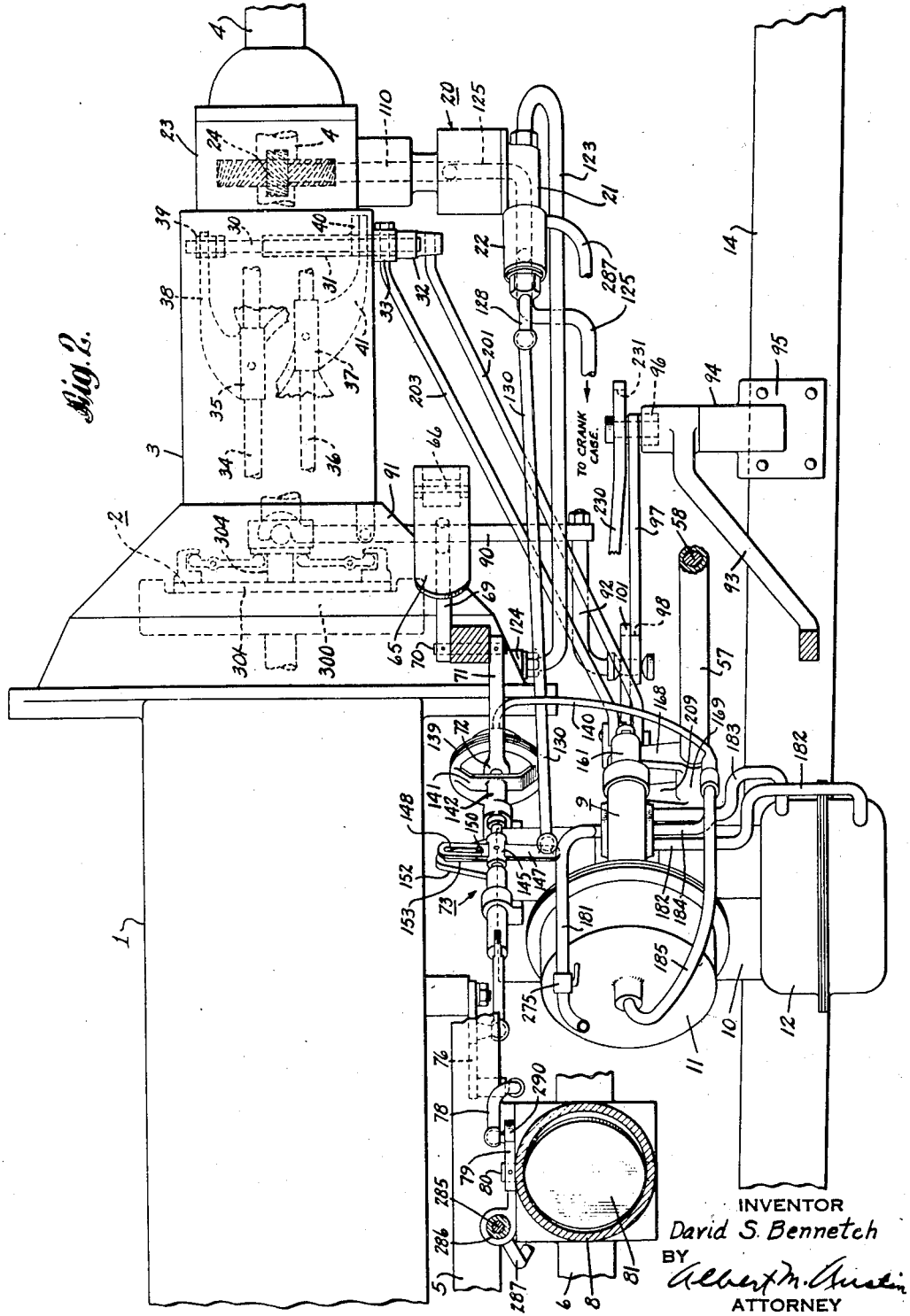

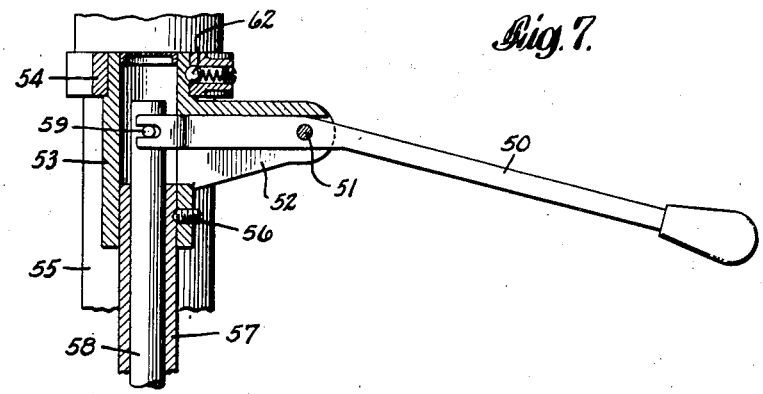
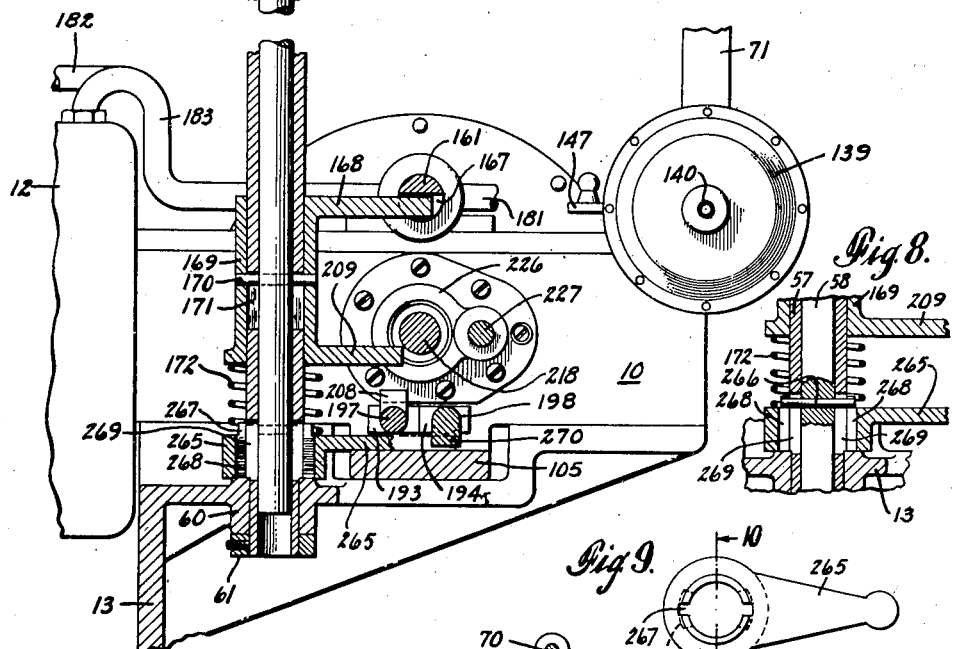

Oct. 12, 1948.
D. S. BENNETCH
2,451,058
SEMIAUTOMATIC AUTOMOTIVE TRANSMISSION WITH
GOVERNOR-SYNCHRONIZED GEARS
Filed July 6, 1939
14 Sheets-Sheet 5
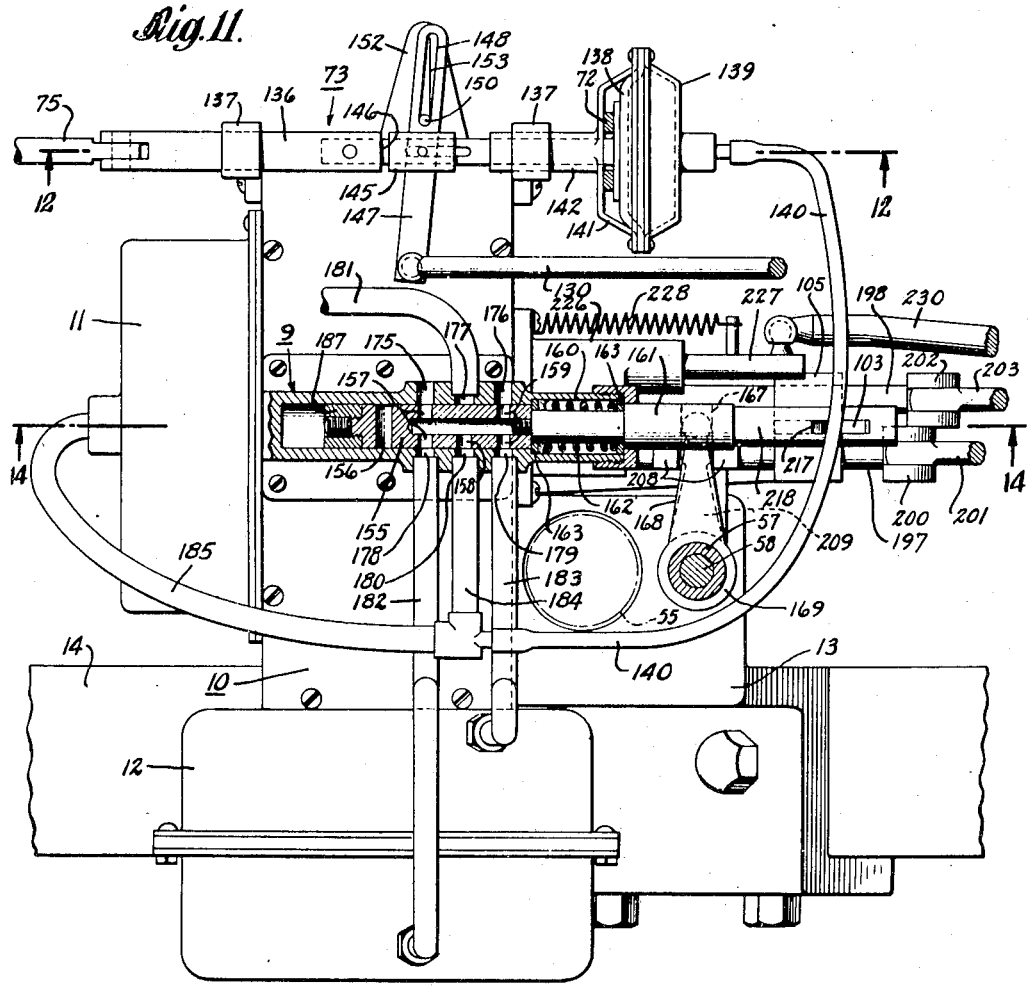
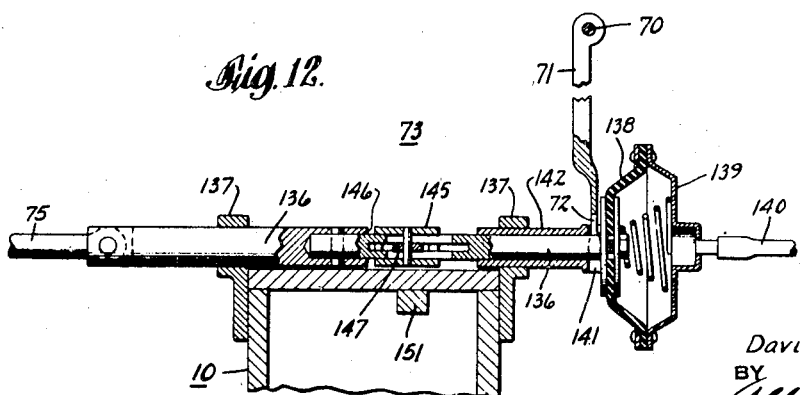
INVENTOR
David S. Bennetch
BY
Albert M. Austin
ATTORNEY

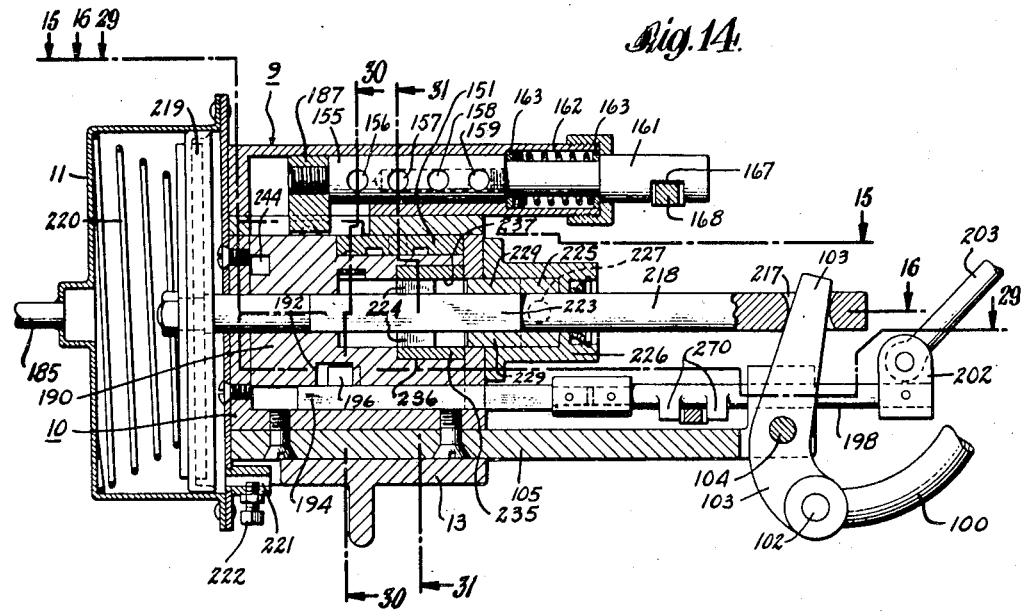
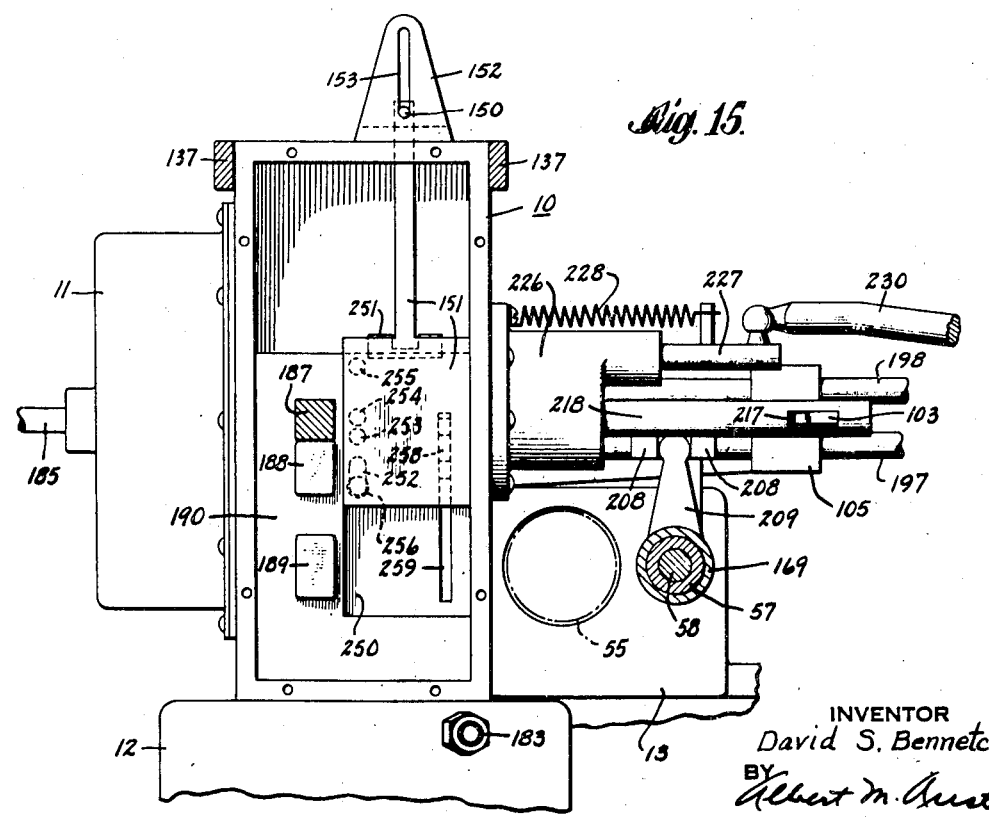

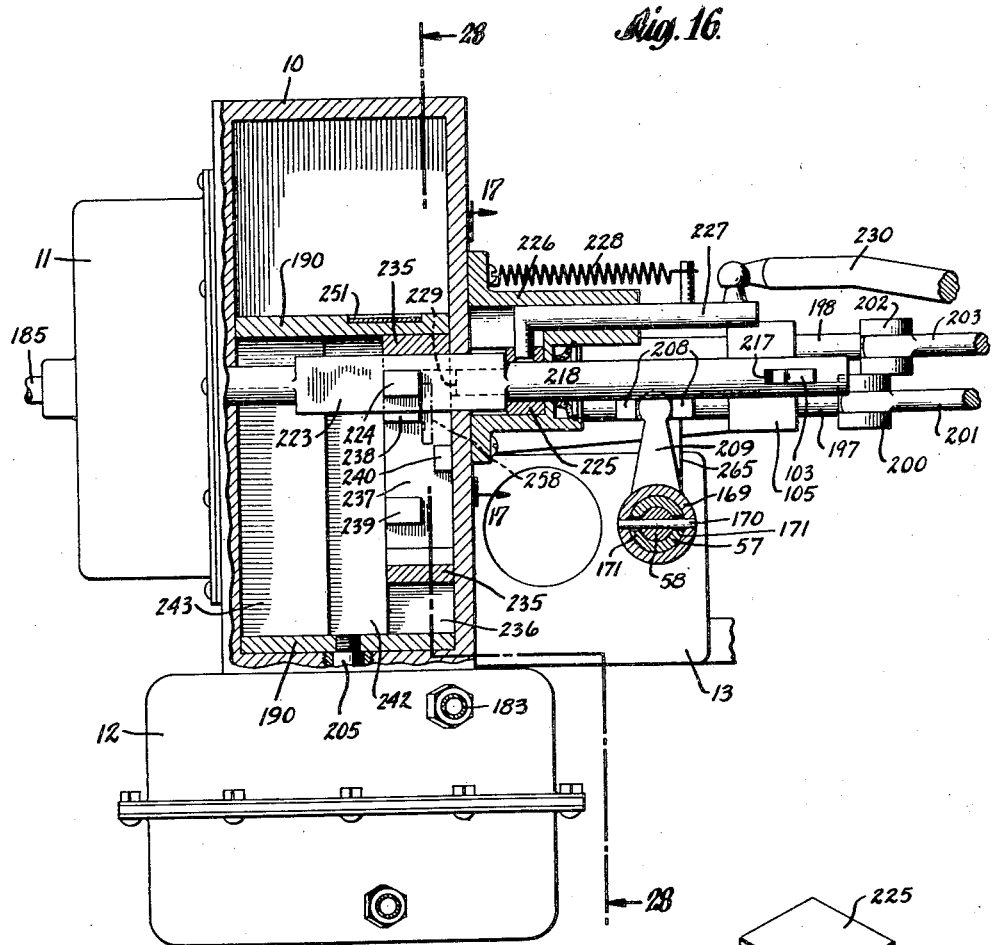
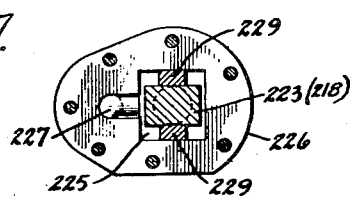
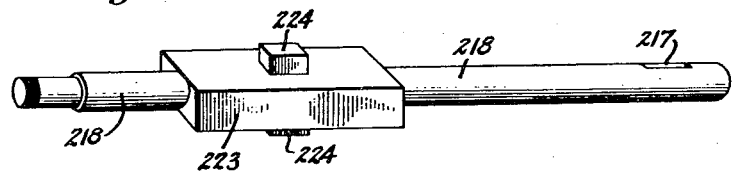

Oct. 12, 1948.       D. S. BENNETCH       2,451,058
SEMIAUTOMATIC AUTOMOTIVE TRANSMISSION WITH
GOVERNOR-SYNCHRONIZED GEARS
Filed July 6, 1939                                   14 Sheets-Sheet 8
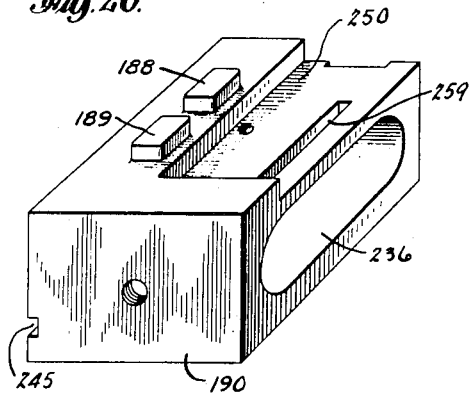
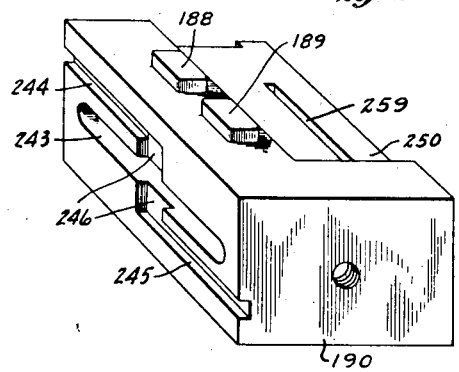
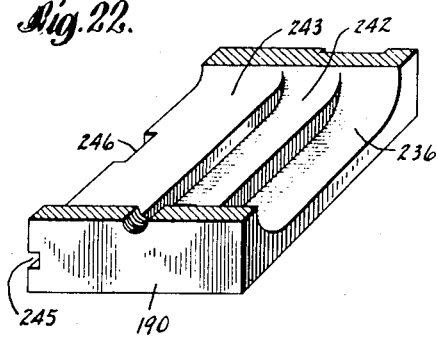
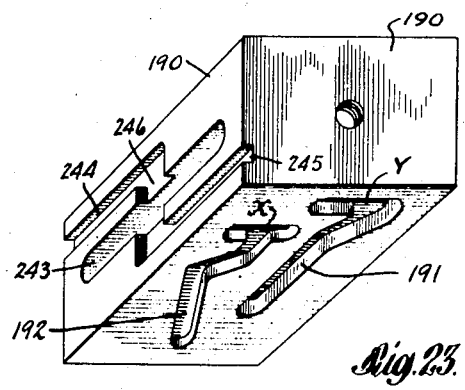
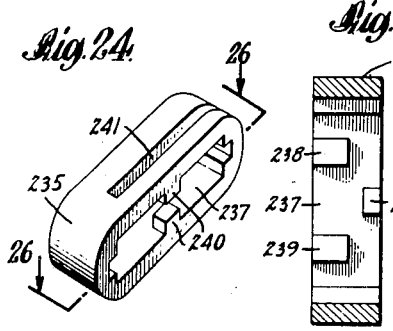
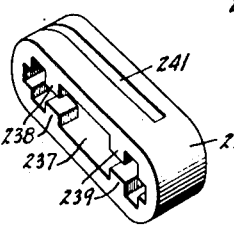
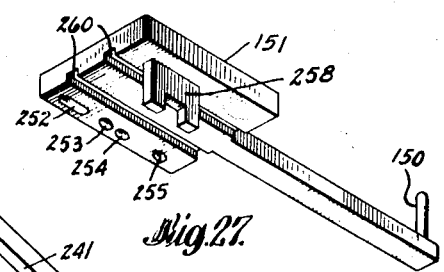
INVENTOR
David S. Bennetch
BY
ATTORNEY Oct. 12, 1948.       D. S. BENNETCH         2,451,058
       SEMIAUTOMATIC AUTOMOTIVE TRANSMISSION WITH
                GOVERNOR-SYNCHRONIZED GEARS
Filed July 6, 1939                    14 Sheets-Sheet 9

INVENTOR
David S. Bennetch
BY
Albert M. Austin
ATTORNEY

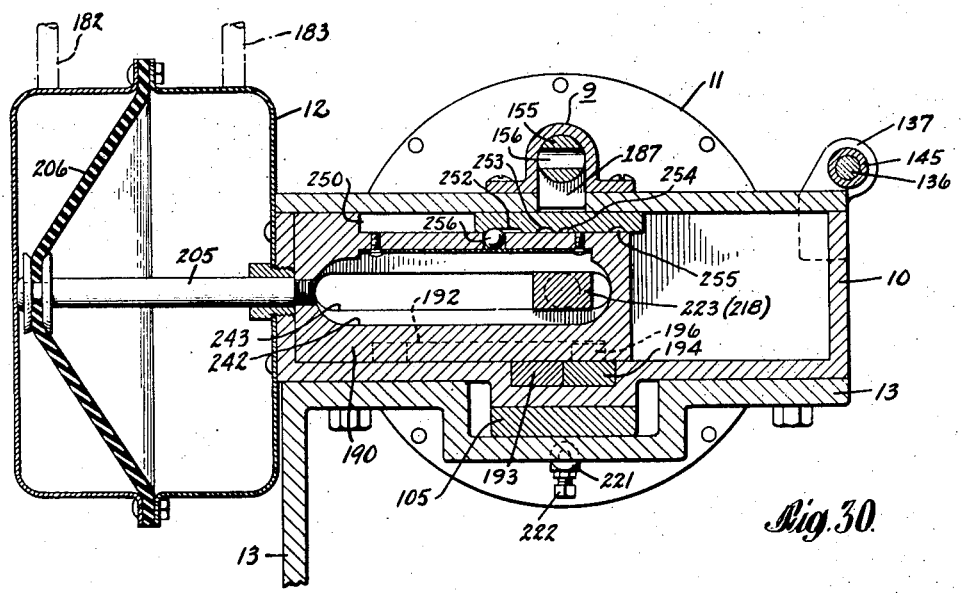
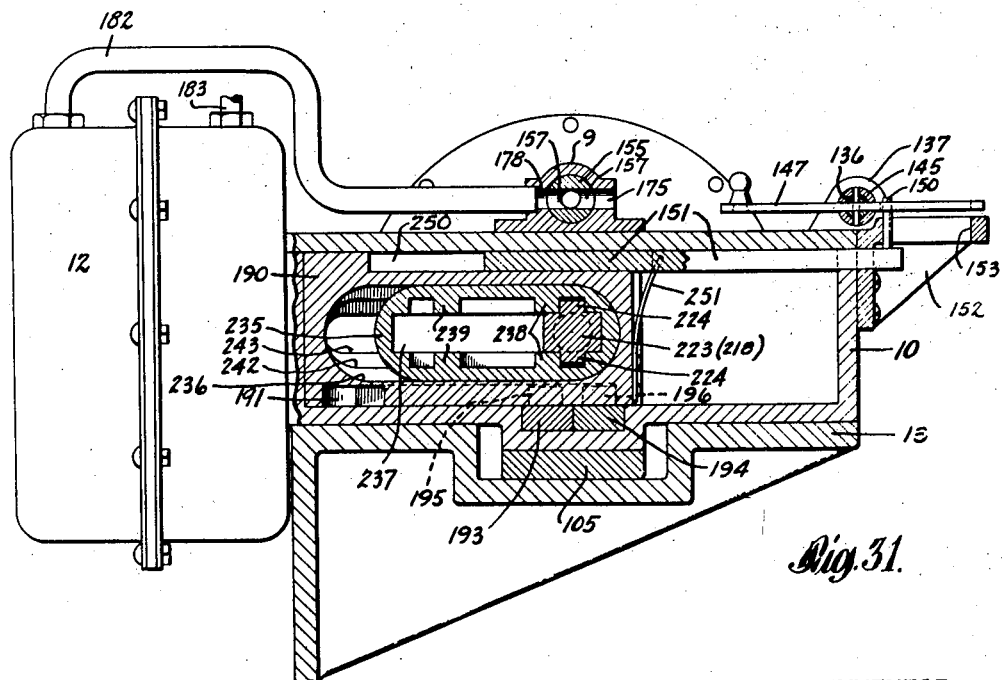

INVENTOR
David S. Bennetch
BY
ATTORNEY

Oct. 12, 1948.	D. S. BENNETCH	2,451,058
SEMIAUTOMATIC AUTOMOTIVE TRANSMISSION WITH
GOVERNOR-SYNCHRONIZED GEARS
Filed July 6, 1939	14 Sheets-Sheet 13
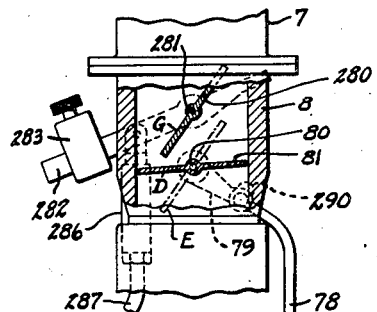
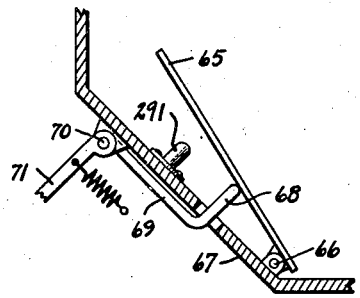
Fig. 41
Fig. 36
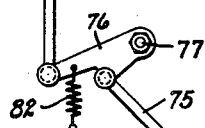
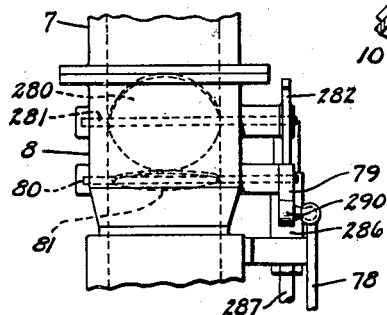
Fig. 37.
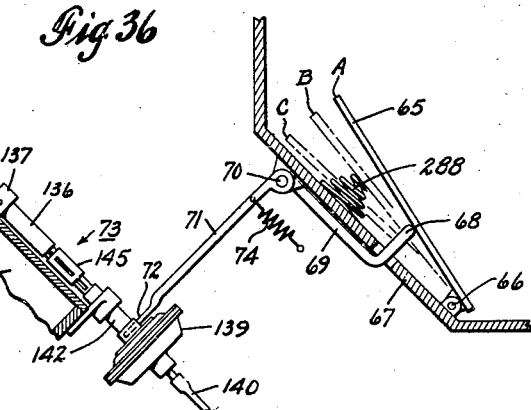
Fig. 38.
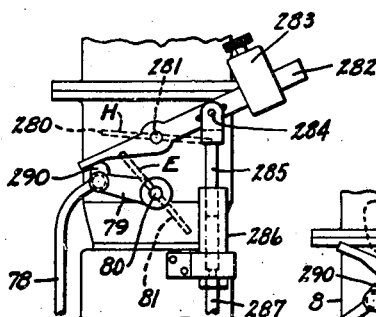
Fig. 39.
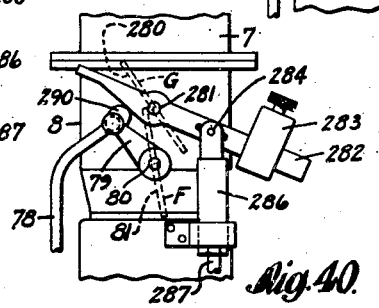
Fig. 40.
INVENTOR
David S. Bennetch
BY
Albert M. Austin
ATTORNEY Oct. 12, 1948.   D. S. BENNETCH   2,451,058
SEMIAUTOMATIC AUTOMOTIVE TRANSMISSION WITH
GOVERNOR-SYNCHRONIZED GEARS
Filed July 6, 1939   14 Sheets-Sheet 14

INVENTOR
David S. Bennetch
BY
Albert M. Austin
ATTORNEY

Patented Oct. 12, 1948

2,451,058

UNITED STATES PATENT OFFICE 2,451,058

SEMIAUTOMATIC AUTOMOTIVE TRANSMISSION WITH GOVERNOR-SYNCHRONIZED GEARS

David S. Bennetch, Sheridan, Pa.

Application July 6, 1939, Serial No. 282,982

19 Claims. (Cl. 74—472)

The invention relates to speed transmissions for automotive vehicles and the like and, more particularly, to an arrangement for facilitating the control of gear shift type transmissions.

According to a preferred embodiment, the invention is applied to a conventional automobile having the conventional gear shift transmission, although many of the principles of the invention may not be limited to such use.

According to said preferred embodiment, the shifting of gears and the manipulation of the clutch is preferably accomplished by simply flipping a hand lever which may be mounted on the steering column or in any other convenient place. The hand lever may have a central position to which it automatically returns when released by the operator. Flipping the hand lever forward will cause the operation of the gears and clutch to shift from a lower speed to a higher speed, referred to hereinafter as an "up-shift." Flipping the hand lever backward operates the gears and clutch to accomplish a shift from a higher speed to a lower speed, referred to hereinafter as a "down-shift."

Provision may be made so that once the control lever is operated the shift cycle is entirely automatic, the clutch being engaged and gears shifted without any further attention on the part of the operator.

For effecting quick and smooth speed change, provision is made for sychronizing the gears in mesh and disengaging them before the clutch is disengaged. The engine speed is then changed to correspond to the new speed ratio after which the clutch disengages, and the new gears engage at the new speed ratio after which the clutch reengages. The new gears coming into engagement and the clutch elements, before they engage, are fully synchronized so that no shock is given to the car.

For accomplishing the above results, a speed governor is provided on the propeller shaft which is connected through an engine control transfer to the engine throttle. The engine control transfer is also connected to the accelerator pedal and, during normal driving, the accelerator pedal controls the throttle to the exclusion of the governor. During the shifting operation, however, the engine control transfer device transfers throttle control from the accelerator to the governor.

For providing a two stage synchronization of the engine at a speed corresponding to the gears in mesh and at a speed corresponding to the new speed ratio into which it is desired to shift, a coordinating device is provided which operates on the engine control transfer to cause the governor to synchronize the engine first at the old speed and then at the new speed.

The gears are shifted and the clutch is operated by suitable vacuum cylinders controlled by a cam box assembly. This cam box assembly has various sliding and shifting blocks and cams giving the proper interlock between clutch and gear movements and also operating the coordinating device.

If desired, the control may be partly semiautomatic and partly full manual, that is, for shifting from first to second and second to third and back again, the shift may take place entirely semi-automatically under the control of the hand lever, as above pointed out, while for shifting from neutral to first or reverse, the shift may require operating the hand lever to change gears and depressing the clutch pedal to disengage the clutch in the old-fashioned way.

If desired, a special arrangement may be made for a "skip shift," whereby the gears may be shifted from first directly to third, or vice versa, if for any reason the operator desired to skip second speed.

The invention also relates to a safety limit speed control. It has heretofore been proposed to provide speed governors to limit the speed of automobiles to a given maximum to cut down the inordinate loss of life and property caused by dangerously high speeds. Well merited objections have been raised to a fixed maximum speed device on the ground that in time of emergency such device might actually increase the hazard of driving.

According to the present invention, a speed limiting device is provided which overcomes the disadvantages of the prior art. The present invention provides a limiting device which normally automatically reduces the gas supply to the engine whenever a predetermined limit of speed is reached, say, fifty miles per hour. However, in case of an emergency, the operator, by pressing unusually hard on the accelerator against an uncomfortably strong spring, may cut out the speed limit control and thus permit the car to travel at an increased speed. The discomfort of holding the accelerator in the emergency position is sufficient to discourage an operator from traveling above the set speed for any length of time. If desired, the car governor may operate directly upon a special speed control valve built in the carburetor adjacent the regular throttle valve. Upon pressing the accelerator against the strong spring during an emergency, the speed control valve, which has been closed by the governor due to the high speed being exceeded, will be opened.

The invention also consists in certain new and original features of construction and combination of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a fragmentary side elevation, partly diagrammatic and partly broken away, of part of an automobile showing the semi-automatic transmission and clutch control applied thereto;

Fig. 2 is a plan view, partly diagrammatic, of the mechanism shown in Fig. 1;

Fig. 3 is a plan section taken on the line 3—3 of Fig. 1 illustrating the governor;

Fig. 4 is a section taken on the line 4—4 of Fig. 3;

Fig. 5 is a section taken on the line 5—5 of Fig. 3;

Fig. 6 is a section taken on the line 6—6 of Fig. 3;

Fig. 7 is a section taken on the line 7—7 of Fig. 1 showing the hand lever for controlling the gear shifting mechanism;

Fig. 8 is a fragmentary section of the lower end of the hand shift rod mechanism, similar to Fig. 7, but showing the parts arranged for full manual operation;

Fig. 9 is a plan view of the extra lever for use in full manual operation;

Fig. 10 is a transverse section taken on the line 10—10 of Fig. 9;

Fig. 11 is a plan view partly in section of the gear shift controlling and actuating unit;

Fig. 12 is a vertical section taken on the line 12—12 of Fig. 11 showing the mechanism whereby the engine speed control is transferred from operator to governor;

Fig. 13 is a section similar to Fig. 12, but showing the parts in the position they assume when the engine speed is under the control of the governor;

Fig. 14 is a vertical section taken along the line 14—14 of Fig. 11;

Fig. 15 is a plan section taken on the line 15—15 of Fig. 14;

Fig. 16 is a plan section taken on the line 16—16 of Fig. 14;

Fig. 17 is a transverse section taken on the line 17—17 of Fig. 16;

Fig. 18 is a perspective view of the clutch actuating bar;

Fig. 19 is a perspective view of a stop block associated with the clutch actuating bar;

Figs. 20, 21, 22 and 23 are perspective views of gear shifting cam block showing respectively the right side, top and front; left side, top and front; lower half in horizontal section; left side, bottom and front;

Figs. 24 and 25 are perspective views of the slide block associated with the cam block;

Fig. 26 is a plan section taken along the plane indicated by the line 26—26 of Fig. 24;

Fig. 27 is a perspective view as seen from beneath of the engine speed coordinating plate;

Fig. 30 is a transverse section taken on the line 30—30 of Fig. 14;

Fig. 31 is a transverse section taken on the line 31—31 of Fig. 14;

Fig. 36 is a side elevation partly in section and dissected out of the rest of the mechanism of the carburetor butterfly valves and associated controlling means;

Fig. 37 is a view of the butterfly valves casing as seen from the right of Fig. 36;

Fig. 38 is a view of the opposite side of the butterfly valves casing from that shown in Fig. 36;

Fig. 39 is a view similar to Fig. 38 but showing the parts in a different position;

Fig. 40 is a view similar to Fig. 38 but showing the parts in still another position;

Fig. 41 is a side elevation partly in section of a modified form of accelerator pedal.

Figure 28:
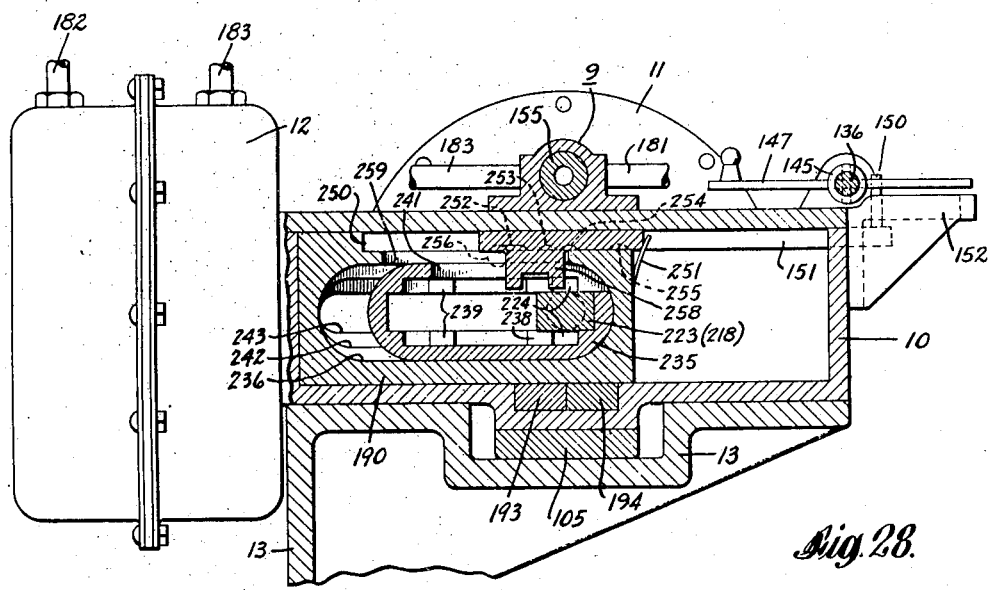
Fig. 28 is a transverse section taken on the line 28—28 of Fig. 16.
Figure 29:
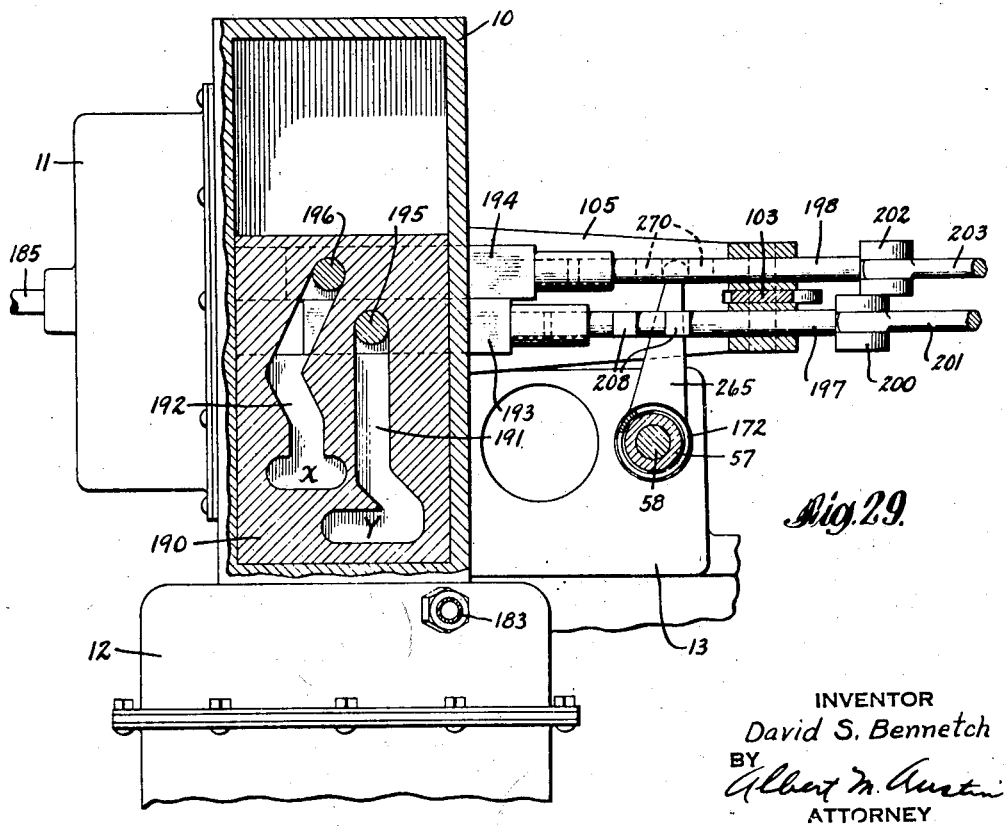
Fig. 29 is a plan section taken on the line 29—29 of Fig. 14.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspects of the invention.

GENERAL ASSEMBLY

Referring to the drawings and, more particularly, to Figs. 1, 2, 7 and 11, the semi-automatic gear shifting and clutch actuating mechanism is shown for purposes of the invention applied to an automobile. However, it will be understood that the invention may be applied to any automotive vehicle, including trucks, railway locomotives and boats. The engine 1, which may be of any well known internal combustion type, is adapted to drive the car through a conventional mechanical clutch 2, speed change gears in a gear box 3 and propeller shaft 4. Mounted upon the engine block 1 in the usual manner is an intake manifold 5, exhaust manifold 6, carburetor 7 and throttle valve casing 8.

The control levers and pedals for operating the car may be quite similar to those on present day cars, but suitably modified to meet the requirements of the invention. In addition to the usual brake pedal (not shown) a clutch pedal 93 and accelerator pedal 65 are provided. In addition to the usual hand or parking brake (not shown) a hand gear shift lever 50 is provided. The shift lever has a central normal position to which, for the regular semi-automatic shifting according to the invention, it automatically returns when the operator lets go. By flicking the shift lever 50 away from the operator, a cycle of events is set into operation which automatically shifts the car from a lower speed to a higher speed without any further attention on the part of the operator and, similarly, by flicking the shift lever toward the operator the car may be automatically shifted from a higher to a lower speed. The hand lever 50 also has provision for a full manual gear shift as explained hereinafter.

The semi-automatic control mechanism comprises, in general, a speed governor 20, a control valve 9, a cam box 10, a clutch operating cylinder 11, a gear shift operating cylinder 12, an engine control transfer mechanism 73 and an engine control transfer operating vacuum box 139. If desired, a speed limiting throttle 280 (Figs. 36–41) and control therefor may be incorporated.

The clutch operating vacuum cylinder 11 is mounted upon the forward side of cam box 10 (left in Fig. 1), the gear shifting vacuum cylinder 12 is mounted upon the outer end of cam box 10, and the vacuum control valve 9 mounted on top of the cam box. The cam box unit may be conveniently mounted beneath the hood of the vehicle in the engine compartment and adjacent the steering column. A bracket 13 may be provided for this purpose and secured to a frame or chassis member 14.

The governor unit is provided for synchronizing engine speed with vehicle speed at certain phases of operation and consists of a centrifugal governor 20 (Fig. 3), an oil pressure by-pass valve 21 controlled thereby, and an oil operated piston cylinder 22 which serves to synchronize the engine speed with vehicle speed through mechanism to be described later. The governor 20 is mounted upon a housing 23 carried on the rear side (right in Fig. 2) of the gear box 3 and is driven by transfer gears 24 from the propeller shaft 4. The governor is thus directly responsive at all times to the road speed of the vehicle.

The speed change gears in the gear box 3 may be shifted to their various positions, such as reverse, neutral, first, second and third speed, in the conventional manner by a pair of concentric rock shafts 30 and 31 (Fig. 2) which are journalled in the gear box 3 and project laterally therefrom. Upon the external end of the rock shaft 30 there is secured a lever 32 which, when actuated, sets the first and reverse gear trains in their selected positions. The hollow rock shaft 31, which is concentric with, but shorter than, shaft 30, carries a lever 33 which, when actuated, serves to set the second and third speed gear trains in their selected positions. The levers 32 and 33 are connected to and operated by mechanism associated with the cam box unit 10 and will be described hereinafter.

Figure 42:
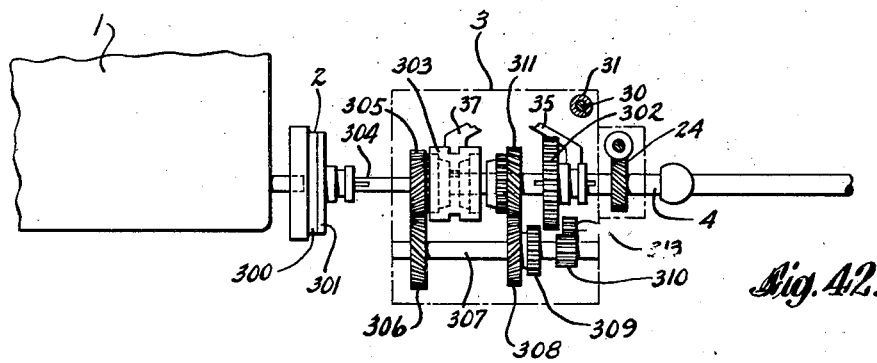
Figs. 42, 43 and 44 show diagrammatically the positions of conventional change gears at different phases of a shift cycle according to the invention.
Figure 43:
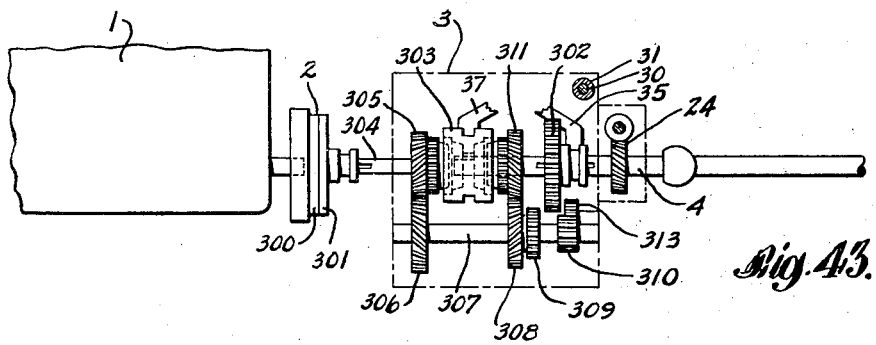
Figure 44:
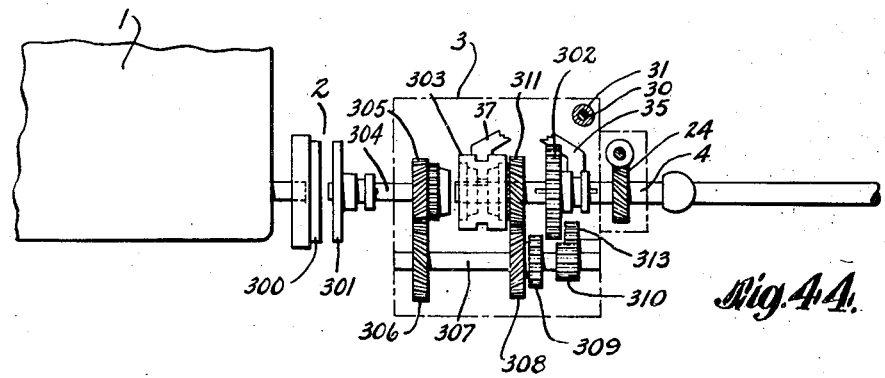

The internal construction of gear box 3 (Figs. 1 and 2) is conventional in form and comprises the usual first-reverse shift rail 34 and yoke 35 for shifting the change gears shown in Figs. 42–44, and the second-third shift rail 36 and yoke 37. The yoke 35 is provided with an arm 38 which is operably connected to a downwardly extending lever 39 secured upon the inner end of rock shaft 30. The hollow rock shaft 31 is provided with a downwardly extending arm 40 which is operably connected to an arm 41 on the yoke 37. Thus, when either rock shaft 30 and 31 is rotated, the corresponding gears controlled thereby may be set in any desired position.

The change gears themselves are of generally conventional construction, as will be understood by those skilled in the art. Referring now to Figs. 42–44, these figures illustrate a conventional gear box 3 connected to clutch 2, engine 1 and propeller shaft 4 in a conventional manner. The clutch 2 comprises clutch element 300 secured to and rotatable with the crank shaft of engine 1 and clutch element 301 slidably secured to the clutch shaft 304.

The gears in gear box 3 comprises a sliding gear 302 and a slidable dog clutch 303 both feather-keyed on propeller shaft 4 and shiftable respectively by yokes 35 and 37. Clutch shaft 304 has rigidly mounted thereon a gear 305. The transmission also comprises a countershaft 307 having rigidly mounted thereon gears 306, 308, 309 and 310. Gear 306 permanently meshes gear 305, gear 308 permanently meshes gear 311 and gear 310 permanently meshes reverse gear 313.

Gear 302 is slidable on shaft 4 to selectively engage reverse gear 313 or first speed gear 309. Slidable clutch 303 has internal clutch teeth to engage clutch teeth on either gear 311 or gear 305. Clutch 303 is shown in engagement with gear 305 for connecting the transmission in high. Clutch 303 is shifted to engage gear 311 for second speed.

The change gears may be of the type where the gears themselves slide to shift gears, or of the later type where the sets of various speed gears are fixed axially and are brought into operation by sliding dogs keyed to the shafts. Or, they may be of the type shown where second and third speed gears are controlled by a shifting clutch or collar and reverse and first speed gears are controlled by a sliding gear. In any case the gears may be said to be "shifted" or "changed" or "engaged" to obtain the different speed ratios, forward and reverse, and in the claims these terms, as applied to the gears, are intended to cover, but not necessarily to be limited to, all cases.

The manual shift and shift control hand lever 50 (Fig. 7) is pivoted at 51 on an arm 52 which is formed integrally on a sleeve 53. The upper end of sleeve 53 is journalled in a bracket 54 secured to the upper end of the conventional steering column 55, and the lower end of sleeve 53 has secured therein by a set screw 56 the top of a hollow shaft 57 inside of which is reciprocably carried a shift rod 58. The upper end of shift rod 58 projects above the end of the hollow shaft 57 and into the central portion of the sleeve 53 and is operably connected to the end of the hand lever 50 by a pin and slot connection 59. The lower end of the hollow shaft 57 is journalled in a boss 60 on the cam box support bracket 13 and held against upward movement by a collar 61. The lower ends of the shift rod 58 and hollow shaft 57 carry certain levers which are operably connected to mechanism associated with the cam box unit 10 described hereinafter.

The hand lever 50 may be resiliently maintained in its central rotative position by a spring pressed ball 62 carried in the bracket 54 and cooperating with a recess in the sleeve 53. By this means, the operator, at such times as the hand lever is not automatically returned to its central position, is enabled to determine this position as he feels the ball 62 drop into the recess.

The accelerator pedal 65 (Figs 1 and 2) is pivoted at 66 on the floor board 67 of the car and is in contact with the ends 68 of an accelerator lever 69 pivotally mounted beneath the floor board 67 on a rock shaft 70. A second lever 71 secured on the rock shaft 70 forms, in conjunction with lever 69, an accelerator bell crank, and the lower end of lever 71 has a fork 72 which is in operable relationship with engine control transfer mechanism generally indicated by 73 (Figs. 12 and 13). A tension spring 74, one end of which is secured to lever 71 and the other to the clutch housing, serves to maintain the accelerator bell crank in engine idling speed position except when the accelerator pedal 65 is depressed The engine control transfer mechanism 73 is pivotally connected by a link 75 to a bell crank 76 pivotally mounted at 77 on the engine block 1. The long arm of bell crank 76 is connected by link 78 to an arm 79 carried on the end of the throttle valve shaft 80. A conventional butterfly valve 81 may be secured on shaft 80 within the valve casing 8 which forms a lower extension of a "downdraft" carburetor 7.

Thus it will be seen that by depressing accelerator pedal 65 the butterfly throttle valve 81 is made to rotate and so regulate the fuel mixture being drawn into the engine through the intake manifold 5. A spring 82 having one end attached to the bell crank 76 and the other affixed to the engine block 1 serves to maintain the throttle valve 81 in engine idling speed position unless engine control transfer mechanism 73 is actuated either by the accelerator pedal 65 or the governor cylinder 22 to which the transfer mechanism is connected by a rod 130.

It will be understood that for ordinary operation, the carburetor throttle 81 is controlled by the accelerator pedal in the ordinary manner, but during certain periods of the gear shifting cycle, the control of the throttle is taken away from the operator and put under the control of automatic devices for driving the engine at the proper speed to synchronize the clutch elements before permitting them to engage.

The conventional clutch 2 (Fig. 2) of the vehicle is actuated by a horizontally disposed and pivotally mounted clutch rod 90 which projects laterally through the side of the clutch housing 91 and has, rigidly secured upon its end, a bent extension 92. The clutch pedal 93, pivoted at 94 on a bracket 95 that is mounted upon the frame member 14, has a downwardly extending arm 96 pivoted to a link connection 97 connected to the clutch rod extension 92 for actuating the clutch rod 90. The link 97 has an elongated slot 98 on one end embracing the extension 92 and is so arranged and designed as to allow the clutch rod 90 to be actuated for disengaging the clutch 2 by the clutch cylinder 11 without thereby actuating the clutch pedal 93.

The clutch rod extension 92 is actuated by the clutch cylinder 11 through a curved link 100 having one end connected to the extension 92 by a slotted head 101, the slot of which corresponds to the slot 98 in link 97, and the other end pivotally connected at 102 to the lower end of a lever 103. The lever 103 is pivoted at 104 on a bracket 105 attached to the cam box 10 and is actuated by the clutch vacuum cylinder 11 through mechanism to be described below in connection with cam box 10. The slotted head 101 of link 100 serves to allow, in certain phases of operation, the disengagement of the clutch by the clutch pedal 93 without the link being affected.

The various vacuum lines, oil lines and linkages interconnecting the various operating and control units will be described hereinafter in conjunction with their related mechanisms.

ENGINE SYNCHRONIZING GOVERNOR

Referring more particularly to Figs 1, 2, 4–6, the centrifugal governor 20 governs engine speed through a hydraulic converter which utilizes a small amount of oil taken from the regular engine lubricating system. The governor 20 acts, during the shift cycle, as explained more particularly below, on engine throttle valve 81 to synchronize the engine speed with the car speed as related first, through the gears in engagement and, second, through the gears to come into engagement.

A drive shaft 110 is journalled in the housing of the governor 20 and has on its inner end the upper gear of a pair of drive gears 24, the lower gear of which is fixed upon the propeller shaft 4. The outer end of shaft 110 projects into a weight chamber 111 of the governor housing and has mounted thereon the elements of the centrifugal governor. The governor consists of a pair of pivoted arcuate weights 112 carried on lateral extensions 113 of a sleeve 114 which is secured on the shaft 110 by a pin 115. The pivotal ends of the weights 112 are provided with toes 116 which bear on a wear collar 117 slidably mounted upon the outside of sleeve 114 and bearing in turn upon the inner end of a valve sleeve 118 which is also slidably mounted upon sleeve 114.

The outer end of valve sleeve 118 is formed as a rectangular projection 119 (Fig. 5) projecting into and forming a part of the oil pressure by-pass valve 21. By-pass valve 21 forms the cover plate of the weight chamber 111 and consists of a cylinder 120 having a rectangular port 121, wherein the projection 119 reciprocates, and a by-pass port 122 connecting port 121 with the weight chamber 111. Oil under substantially constant pressure is admitted into cylinder 120 through a pipe 123 which takes it from the supply created by the conventional oil lubricating pump (not shown) mounted in the engine 1. Pipe 123 is connected to the engine oil supply at 124 (Fig. 1) located on the side of the clutch housing 91. Oil which is by-passed through ports 121 and 122 into chamber 111 is led back into the engine crank case through pipe 125.

The oil pressure cylinder 120 is provided with a hollow sliding plunger 126 having an enlarged head or piston 127 which reciprocates in a cylinder 22 formed as an extension of by-pass cylinder 120. Plunger 126 is actuated by the varying oil pressure passing through its hollow center out through ports 126' to the back face of piston 127. A piston rod 128 is fixed in the piston 127, sealing one end of the hollow plunger 126, and passes out of the cylinder 22 through cylinder closure 129.

The outer end of piston rod 128 is pivotally connected by a ball and socket joint to a connecting rod 130, the other end of which is operably associated with the engine control transfer mechanism 73. A compression spring 131 is mounted in the cylinder 22 between the piston 127 and closure 129 and serves as a direct reactance for the variable oil pressure created in cylinders 120 and 22 of the by-pass valve 21. Adjustment of the compression of spring 131 is accomplished by screwing the closure 129 in or out of cylinder 22. Any oil which might leak past piston 127 is led back to the crank case through pipe 132 connected to pipe 125.

Pipe 123 is restricted so that only a small part of the oil from the pressure side of the engine lubricating pump is taken. The oil pressure in cylinder 120 is determined by the oil bled from the cylinder through ports 121 and 122. While pressure in cylinder 120 varies considerably due to the action of the governor 20 with different car speeds for reasons explained below more in detail, a comparatively small change in the amount of oil bled is required to obtain this pressure variation, so it may be said that the oil taken by the governor is substantially constant.

The amount of bleeding during the shifting operation and, therefore, the oil pressure in cylinder 120 is determined by the relative position of the edge of piston 126 and the inclined lower surface of plunger 119. The relative positions of these parts define what may be termed the critical bleeding point, indicated in Fig. 3 by 18. During the shifting operation no important impedance is offered by the piston 126 blocking port 121 or by plunger 119 blocking port 122, so that we have substantially the full oil pressure of cylinder 120 on plunger 119 to the right of the bleeding point 18 and substantially zero oil pressure on plunger 119 to the left of the bleeding point 18.

It is obvious that the size of bleeding point 18 will vary either by movement of piston 126 or by movement of plunger 119, or by movement of both together. Although the size of the bleeding point 18 does not vary greatly, its position varies due to the movement of piston 126.

Fig. 3 shows the position of the governor with the car substantially stationary. The oil supplied to the cylinder 120 by the idling engine moves piston 126 to the left to cause it to clear the edge of port 121. When the car is speeded up sufficiently for the shifting operation, the plunger 119 moves down in Fig. 3. The critical bleeding point 18 decreases in size sufficiently to raise pressure in cylinder 120. The higher the car speed the smaller the critical bleeding point 18 becomes and the higher the pressure in cylinder 120. Increase of pressure in cylinder 120 moves piston 126 to the left against its compression spring 131 until it builds up an equivalent force in spring 131. This opens the car throttle and speeds up the engine to correspond to car speed, thus synchronizing engine and car.

It should be noted that downward movement of plunger 119 is resisted not only by increase in pressure in cylinder 120, but also by the additional area of plunger 119 exposed to this pressure caused by movement of piston 126 to the left in Fig. 3.

As an example of the operation of the variable area of plunger 119, assume that the combined area of pistons 126 and 127 is one square inch and that the cross sectional dimensions of plunger 119 are ½" x ¼". Consider the conditions when the plunger 119 is half exposed and also when plunger 119 is wholly exposed to the pressure in cylinder 120. When the plunger 119 is half exposed, the exposed area equals ¼" x ¼" which equals $\frac{1}{16}$ of a square inch. When the plunger 119 is fully exposed, its exposed area is equal to ¼" x ½" which equals ⅛ of a square inch. Since the area of piston 126, 127 remains constant, the ratio of exposed area of plunger 119 to the exposed area of piston 126, 127 changes from $\frac{1}{16}$ to ⅛, giving the desired relation between the forces exerted on piston 126, 127 and plunger 119.

During the governing operation, we are dealing with idling conditions of the engine. If the engine is pulling the car, its idling speed is too fast and hence the throttle must be closed so that no driving torque shall be imparted by the engine to the car. If, on the other hand, we are using the engine as a brake, as by going down a hill, the engine speed is too slow and the throttle must be opened so that no torque shall be imparted to the engine from the car.

With the idle engine, comparatively small movement of the butterfly throttle and linkage is necessary to change the idling speed through the small range necessary for synchronization. This movement may thus be considered proportional to engine speed. The ordinary centrifugal governor, on the other hand, does not respond directly proportionally to car speed, but its response varies with the square of the car speed. The hydraulic arrangement may, therefore, be termed a converter since it converts the non-linear response of the governor to a linear response so that the movement imparted to the throttle valve through the link 130 is substantially directly proportional to car speed.

A further advantage of the hydraulic converter is the fact that large mechanical force may be obtained by the use of a small governor. In actual tests two two-ounce governor weights operated to vary the oil pressure in cylinder 120 from one and one-half to twelve pounds which provided all the force necessary for operating the carburetor throttle and overcoming the friction in the linkage. A governor with such small weights obviously has a small operating force at slow speeds, but by the use of the hydraulic converter, this small operating force can be converted into the relatively large force necessary for operating the throttle.

It will thus be seen that, when the engine speed is under control of the governor mechanism, its speed is always related to the car speed. However, since the speed change gears are interposed between the engine and the governor drive gears 24, a supplemental mechanism is necessary to increase or decrease the engine speed to relate this speed to the car speed as it may be represented by the different speed ratios of the change gears, such as first, second, third or reverse. This supplemental mechanism forms part of the engine control transfer mechanism 73 described below.

ENGINE CONTROL TRANSFER MECHANISM

Referring now more particularly to Figs. 1, 2, 11 and 12, the engine control transfer mechanism 73 is shown with the parts in the position assumed when the engine is under control of the operator and the change gears are in third speed. Fig. 13 illustrates the position of the parts during a gear shifting cycle when the engine speed is under control of the governor mechanism.

The transfer mechanism comprises a push rod 136 composed of two members pinned together in their central portion and slidably supported upon the cam box 10 in brackets 137. Upon one end of the rod 136 there is bolted the flexible diaphragm 138 of a vacuum box 139 which is maintained in its distended position by a self contained spring except when vacuum is applied through flexible pipe 140. Secured on the forward side (left in Figs. 11 and 12) of the vacuum box 139 is a bridge plate 141 from which a sleeve 142 extends forwardly to be slidably supported in one of the brackets 137. The smaller portion of rod 136 passes through sleeve 142. The forked end 72 of accelerator lever 71 spans the rod 136 and lies between the back face of the bridge plate 141 and the clamping plate by which rod 136 is secured to the vacuum diaphragm. The spring in vacuum box 139 serves to maintain the fork 72 locked between bridge plate 141 and diaphragm 138 during normal operation of the car. Thus, it will be seen that, when the accelerator pedal is actuated, the motion is transmitted through lever 71 to the rod 136 and thence through link 75 to the throttle valve 81, increasing or decreasing the engine speed as desired.

Means for transferring the engine control from the accelerator pedal to the governor mechanism is operably mounted upon the rod 136 and comprises a sliding sleeve 145 carried by the rod 136 between a shoulder 146 on the rod and the end of sleeve 142. The sleeve 145 is pivotally secured to the central portion of a lever 147 which passes through both the sleeve and the rod 136, clearance slots being provided therein so that the lever acts only on the sliding sleeve 145. One end of the lever 147 is connected by the link 130 to the governor mechanism, while the other end is slotted at 148 to receive a movable fulcrum pin 150 which is carried by the projecting end of a speed ratio coordinating plate 151 (Figs. 27, 31) associated with mechanism in the cam box 10 to be described later. A slotted guide bracket 152 mounted upon the cam box 10 has a slot 153 to guide and limit the fulcrum pin 150 in its movements. The coordinating plate 151 and its fulcrum pin 150 is, when acted upon by mechanism to be described below, automatically set at any one of three positions which correspond to the three gear ratios, first, second and third, of the car.

When the gear shifting cycle is instituted, by the operator moving the hand lever 50, vacuum is applied to vacuum box 139, collapsing it and causing the sleeve 142, carried thereon, to slide forward (left in Fig. 12) on the rod 136 until the sleeve end meets the slide sleeve 145, at which time rod 136 is moved rearwardly until the shoulder 146 thereon contacts the other end of slide sleeve 145. The rod 136 is thus locked to the slide sleeve 145 (see Fig. 13) while the forked end 72 of accelerator lever 71 has been released from its locked position between bridge plate 141 and diaphragm 138 due to the latter members having been moved apart. The rod 136 will thus transmit any motion of the slide sleeve 145 to the throttle valve 81 through linkages previously described, while the accelerator lever 71 is free to move under the influence of the accelerator pedal 65 without affecting the engine speed in any way.

The motion of the slide sleeve 145 is responsive to the car speed as translated by the governor through the link 130 and lever 147, but is modified by the position of the fulcrum pin 150 so as to coordinate its position with whatever speed ratio the change gears are about to assume. Thus, in Fig. 11, fulcrum pin 150 is shown in its third speed position and the lever 147 at a slight angle representing a car speed of approximately fifteen miles per hour. In a down shift to second speed, it is necessary to increase the engine speed to synchronize it with the fifteen miles per hour car speed and this is accomplished by the outward movement of the fulcrum pin 150 which thus becomes, temporarily, the moving force on lever 147. The actual fulcrum of lever 147 during this operation is its pivotal connection to link 130. It will thus be seen that the outward movement in a straight line of the pin 150 as it moves to a point midway along the slot 148 in the lever, shifts the lever and the slide sleeve 145, pivoted thereon, to the left (Fig. 13) and this motion is transmitted to the throttle valve 81, thereby increasing the engine speed. A similar outward movement of pin 150 still further along slot 148, as a gear shift is made from second to first speed, moves the slide sleeve 145 still further to the left and again increases engine speed to make it correspond to the fifteen miles per hour car speed as translated through the gear ratio. The motion and positioning of the fulcrum pin 150 is accomplished by mechanism contained in the cam box 10 described hereinafter.

VACUUM CONTROL VALVE

Referring now more particularly to Figs. 11, 14 and 15, the vacuum control valve 9 comprises a cylinder mounted upon the cover plate of cam box 10 and having a ported slide valve plunger 155 adapted for reciprocation therein. The slide valve 155 is formed with ports 156, 157, 158 and 159 and a central communicating chamber interconnecting ports 157, 158 and 159. Attached to the right end (Fig. 11) of the slide valve 155 is a valve stem 161 which passes through an enlarged portion 160 of the valve cylinder in which a spring 162 is mounted for maintaining the valve in a central position. A pair of washers 163, forming abutments for the spring 162, co-act with shoulders formed on the valve stem 161 and the end walls of the spring chamber 160 so that the valve 155 is returned to its central position after a completed cycle whether it has been moved to the right or left.

For the purpose of shifting the valve 155 either to the right (a down-shift) or left (an up-shift) the projecting end of valve stem 161 is provided with a groove 167 on its underside in which is normally seated the end of an upper arm 168 of a double armed lever 169. The double armed lever 169 is slidably mounted upon the hollow shaft 57 (Fig. 7) of the hand control lever 50 and rigidly secured on the rod 58 by a pin 170. The hollow shaft 57 is provided with a slot 171 through which the pin 170 passes, thus allowing a limited vertical movement of rod 58 and lever 169 with respect to hollow shaft 57, at the same time locking all three members together with respect to any rotative movement of the shaft 57. A compression spring 172, surrounding hollow shaft 57 and abutting the underside of lever 169 urges the latter and the rod 58 to their uppermost position as determined by the slot 171 in hollow shaft 57.

Various ports are provided in the wall of the control valve 9 and consist of vent ports 175, 176, vacuum port 177, gear shift cylinder ports 178, 179, and clutch cylinder port 180 which also supplies vacuum to the vacuum box 139 of the transfer mechanism 73. The vacuum port 177 is connected to the intake manifold 5 by a pipe 181 and the pipes 182 and 183 connect respectively the ports 178 and 179 to the opposite sides of the double acting gear shift cylinder 12. Pipe 184 leads from the port 180 and is provided with a branch line 185 communicating with the clutch cylinder 11, and a flexible branch line 140 connected to the vacuum box 139.

Means are provided for holding the slide valve 155 in either the right or left position to which it may have been manually shifted until the train of movements instituted thereby has been completed. As embodied, a detent 187 is secured on the left end (Figs. 11 and 14) of the slide valve 155 and projects downwardly through holes in the control valve cylinder 9 and in the cover of the cam box 10. The detent 187 lies in the path of two lugs 188 and 189 formed on the upper surface of a cam block 190 (Fig. 15). Thus, the cam block 190 cannot move inwardly (up in Fig. 15) until the detent 187, and hence the valve 155, has been fully moved either to the right or left, nor, once the cam block 190 has started to move, can the detent and valve return to its central position until the lug 188 or 189 has moved out of the detent's path and hence the shift completed.

The centralizing spring 162 of the valve 9 also serves to return the hand lever 50 to its normal central position after a gear shifting cycle has been completed during a normal up-shift or down-shift.

CAM BOX

The mechanism contained within the cam box 10 consists generally of cam means for shifting the change gears to their various positions, means for operating the clutch in timed relation to the gear shift cycle and means for coordinating the engine speed with the car speed in timed relation with the clutch operation and in relation to the position of the change gears.

(A) *Gear shift cam block*

Referring now more particularly to Figs. 14, 15, 16 and 20 to 35 inclusive, the cam blocks 190 (Figs. 20 to 23) has rectangular faces and is slidably mounted within the cam box 10 whose length is such as to allow the cam block 190 to be moved to any one of its three main positions representing third, second and first (or reverse) change gear positions. The cam box 10 is a substantially oil tight covered box and may be provided with a lubricant of medium viscosity which, besides its primary function of lubrication, also serves as a sound and motion dampening means, as will be later described.

The means whereby the change gears are shifted comprises a pair of cam grooves 191 and 192 (Fig. 29), formed in the bottom surface of the cam block 190, the groove 191 controlling the first and reverse gear ratio and the groove 192 controlling the second and third gear ratio.

A pair of cam bars 193, 194 (Fig. 29) on which cam rollers 195, 196 are pivotally mounted, are slidably carried beneath the cam block 190, in a recess formed in the bottom of the cam box 10 and project rearwardly (right in Fig. 14) therefrom and have attached to their ends a pair of push rods 197, 198 which are slidably mounted in bracket 105 mounted upon the cam box 10. A pivot block 200, secured on the end of push rod 197, has pivoted thereto a connecting rod 201 which is pivotally connected to gear shift lever 32 (Fig. 2). A pivot block 202, secured on the end of push rod 198, has pivoted thereto a connecting rod 203 which is pivotally connected to gear shift lever 33. Thus, it will be observed, when the cam block 190 is moved inwardly from the third speed position (Fig. 29) the cam groove 192 moves the cam bar 194 so as to successively shift one set of change gears from their third speed position to transitory neutral, then to second and finally to neutral at which point the groove is broadened as at X to permit, through means to be described later, the manual shifting of the gears. During the same movement of cam block 190, the cam bar 193 is moved from neutral to its first speed position where the broadening of the groove 191 as at Y permits the manual movement of the bar to either first or reverse speed position.

Means for moving the cam block 190 to its several positions are provided and, as embodied, comprise a double acting diaphragm vacuum cylinder 12 (Fig. 30) secured to the outer end of the cam box 10, and a piston rod 205 having one end clamped to the diaphragm 206 and the other end passed through the end wall of the cam box and secured, as by screw threads, to the cam block 190. Movement of the cam block is effected by the application of vacuum to either one side or the other of the cylinder 12 with a corresponding admission of atmosphere to the opposing side. The application of vacuum and atmosphere is manually controlled by the control valve 9 and pipes 182 and 183 as previously described.

The mechanism, as regards the shifting of the gears from neutral to first or to reverse and back again, is not automatic but under full manual control. To implement this manual control, the push rod 197 (Fig. 29) by which the first and reverse change gears are placed in their various positions, is provided on its upper surface with two spaced apart lugs 208 adapted to receive the rounded head of the lower arm 209 (Fig. 7) of the double arm lever 169 forming part of the hand lever control mechanism 50. Thus, when the gears are in first speed position due to the cam block 190 having moved to its innermost position (up in Fig. 29) the cam roller 195 lies in the broadened portion Y of cam groove 191 and is free to be moved by the hand lever 50 to positions representing neutral and reverse gear positions.

(B) *Clutch operating mechanism*

Referring now more particularly to Figs. 1, 2 and 14, the curved link 100, which is operably connected to the clutch disengaging rod 90, is pivotally attached to the lower end of lever 103 pivoted at 104 on the end of bracket 105 midway between the two push rods 197, 198. The upper end of lever 103 (Fig. 14) is seated in a slot 217 in the end of a clutch bar 218 which passes completely through the cam box 10 and cam block 190, into the vacuum cylinder 11 where it is attached to the piston 219. A coiled spring 220, carried within the cylinder 11 and acting between the cylinder head and the piston, serves to return the clutch bar 218 to clutch engaged position.

The cylinder 11 is connected to the vacuum control valve 9 by pipes 185, 184 (Fig. 11) and the speed at which the clutch 2 engages is determined by an atmosphere valve 221, the opening of which is adjusted by a thumb screw and lock nut, indicated by 222.

The clutch bar 218, shown in detail in Fig. 18, is formed in its central portion, with an enlargement 223, upon the upper and lower surface of which project a pair of stop lugs 224.

Slidably mounted on the clutch bar 218, adjacent the rear end of enlargement 223 (right in Fig. 16) is a stop block 225 shown in detail in Fig. 19. Stop block 225 is slidably mounted in a housing 226 mounted upon the rear side of the cam box 10. The stop block 225 is provided with two forwardly projecting arms 229, which, in their normal position, lie on the upper and lower surfaces of the enlargement 223.

Slidably mounted in the housing 226, and operably conected to the stop block 225, is a block movement holding rod 227, having attached thereto, a tension spring 228 serving, normally, to hold the stop block 225 against the enlargement 223 on the clutch bar 218. Upon the end of holding rod 227 there is pivotally attached one end of a connecting rod 230, the other end of which is operably connected by a lost motion slot 231 to the clutch pedal arm 96 (Figs. 1 and 2).

Acting between clutch bar 218 and cam block 190 an oval shaped slide block 235 shown in detail in Figs. 24–26. Block 235 is slidably mounted in a recess 236 in the cam block 190 and has a passageway 237 through which the clutch bar 218 passes. Passageway 237 is of such length as to permit the slide block itself to move transversely on the clutch bar 218. Paired lugs 238, 239 and 240 project inwardly from the top and bottom surfaces of the passageway 237. The lugs 238 and 239 cooperate with stop lugs 224 on the clutch bar 218 and the lugs 240 cooperate with the arms 229 on the stop block 225 at certain stages of the gear shifting cycle, as explained hereinafter. A slot 241, extending substantially the full length of the slide block, is formed in the top wall thereof and communicates with the passageway 237 along a line between the lugs 238, 239 and the lugs 240.

The recess 236 in the cam block 190 forms part of a passageway through the block, the mid-portion 242 having the same length as recess 236 but its vertical dimension is such as to permit freedom of movement between the cam block 190 and the clutch bar 218 when the lugs 224 on the latter have been retracted into this mid-portion. The forward portion 243 of the passageway (left in Fig. 22) is also the same length as recess 236 but is still further reduced in its vertical dimension since it is only necessary in this portion to provide a passageway for the thickness of the clutch bar 218.

Means for dampening the noise and retarding the movement of the cam block 190 as it reaches either of its end positions or intermediate position are provided and consist of restricted passages 244, 245 formed in the forward face of cam block 190 and adapted to pass the lubricating fluid from the inner to the outer end of the cam box as the cam block moves to its various positions. Passage 244 is in staggered relation to passage 245 but communicates therewith by a cross passage 246 which cuts through the passageway 243 in the cam block.

(C) Engine speed coordinating mechanism

Referring now more particularly to Figs. 15, 27, 30 and 31, the engine speed coordinating plate 151, upon the end of which is the fulcrum pin 150, is slidably mounted in a recess 250, formed in the top surface of the cam block 190, and held in place by the cover plate of the cam box 10. A leaf spring 251, secured at its lower end in a groove in the inner face of the cam block 190, has its upper end forked and adapted to engage shoulders on the plate 151 so as to urge it part ways towards the rear of recess 250.

Means are provided whereby the plate 151 derives its motion from the motion of cam block 190 but does not travel the same distance traveled by the cam block, nor start and stop its motion in conformity therewith. As embodied, a series of spaced apart, shallow recesses 252, 253, 254, 255 are formed in the bottom surface of plate 151 adjacent the forward edge thereof (left in Fig. 15), and a spring pressed ball 256, adapted to engage these recesses, is mounted in an orifice in the bottom of the recess 250 of the cam block. A recessed tooth 258 projects downwardly from the bottom of plate 151 and passes through clearance slot 259 in cam block 190 and slot 241 in slide block 235 to a position in the passageway 237 of slide block 235 midway between lugs 238, 239 and lugs 240 so as to have free movement relative thereto. The recess in the tooth 258 is adapted to be engaged by the upper arm 229 of the stop block 225 at certain stages of the shift cycle thus arresting the motion of plate 151 until such time as the arm is retracted from the tooth. A pair of grooves 260 in the under surface of the plate 151 are provided to prevent the trapping of the lubricant in the recess 250 which might thereby interfere with the movement of the plate.

CAM BOX OPERATION

It is helpful to consider the relation between the various elements in the cam box. The cam box contains five main parts, the cam block 190, slide block 235, clutch bar 218, stop block 225 and the coordinating plate 151. There is a certain interlocking between the action of these various parts which control the shifting cycle.

The cam block 190 moves lengthwise of the cam box (laterally of the car). The cam block has two functions, first, to shift the change gears by its cam grooves 191 and 192 and, second, to actuate the coordinating plate 151 by the spring ball 256 and leaf spring 251.

The slide block 235 moves back and forth in the stepped passage 236 of the cam block and moves, at times, with the cam block and at times it is stationary while the cam block moves relative thereto. Its interior lugs 238, 239 and 240 cooperate with lugs 224 and 229, as shown below.

The clutch bar 218 moves transversely in the cam box (lengthwise of the car) through the cam block 190 and slide block 235. The clutch bar carries the stop block 225, which for most purposes may be considered a part of the clutch bar. The only time the stop block 225 does not move with the clutch bar 218 is during the so-called skip shift.

Clutch bar 218 and stop block 225 move with the clutch cylinder 11 and have two extreme positions only, viz. clutch disengaged (Figs. 32, 33) and clutch engaged, (Fig. 16).

The coordinating plate 151 slidably mounted on the top of the cam block partakes of part of the motion of the latter, being held against that motion, or released to share it, by the cooperation of its recessed tooth 258 and the stop block 225 or by interaction of spring ball 256 (Fig. 30) and the recesses 252, 253, 254, 255 and leaf spring 251 (Fig. 31). The coordinating plate has three positions corresponding to the three speed ratios.

The lugs 238 and 239 on the slide block 235 cooperate exclusively with the lugs 224 on the clutch bar 218. The lug 240 on slide block 235 cooperates exclusively with the arms 229 on stop block 225. The recessed tooth 258 on coordinating plate 151 cooperates exclusively with arm 229.

The cam block has five positions, three main positions corresponding to third, second and first speeds, and two intermediate or transitory positions corresponding to the transitory neutral positions between these speeds. Fig. 16 illustrates its position in third speed, Fig. 32 its position in second speed and Fig. 33 its position in first speed. Thus, the cam block in moving from any speed to any other does it in two stages or half movements. The engagement of either lug 238 or 239 with lug 224 determines the position of the cam block at the end of its first half movement in any shift, while the engagement of lug 240 with arms 229 determines the position of cam block at second speed and the engagement of the cam block with the ends of its box determine the position of the cam block at its first and third speeds.

The coordinating plate 151 moves only during the first half movement of the cam block 236 when the latter is moving between any two speeds in either direction, but not with the second half movement. The first and third speed positions of the coordinating plate 151 are determined by the engagement of pin 150 in the ends of its slot and the second speed position by engagement of the arm 229 with the notched tooth 258.

The dampening action for quieting and assisting in the stopping of the cam block 190 in its five stopping positions operates as follows: As the cam block 190 approaches its intermediate or second speed position, the flow of fluid through passages 244, 245 and 246 is restricted when the passage 246 is increasingly obstructed by its spanning the clutch bar 218. The dampening effect on cam block 190 at either its first or third speed position is due to the diminishing space between the cam block and the end of the control box, this resulting in retarding the flow of fluid to the cam block passages 244, 245, rather than in the passages themselves. The damping effect of the viscosity of the fluid in the various passages is sufficient to eliminate shock in the two transitory neutral positions of the cam block 190.

OPERATION OF CAR

The semi-automatic control according to the invention handles the mechanism of the car somewhat differently from the conventional manner of ordinary hand shifting. In the ordinary manual operation of the conventional automobile, in shifting from second to third, for example, the operator first disengages the clutch, then disengages the second speed gear, then engages the third speed gears and then reengages the clutch. The operator ordinarily takes his foot off the accelerator during the shifting of the gears, but for smooth operation, he usually speeds up the engine just before he permits the clutch to reengage.

According to the present invention, the semi-automatic shifting apparatus operates somewhat differently, as will be understood from the following analysis taken with Figs. 42–44. Clutch element 300 always rotates at the same speed as the engine 1. Sliding gear 302 and sliding clutch dog 303 always rotate at the same speed as the propeller shaft 4. Located between the gears on propeller shaft 4 and clutch element 300 is the "floating" assembly made up of clutch element 301, clutch shaft 304, gears 305, 306, countershaft 307, gears 308, 309, 310, 311 and 313. When the gears are in neutral and clutch 2 is engaged, this floating assembly rotates at a speed corresponding to the engine speed. When clutch 2 is disengaged and any set of gears is engaged, the floating assembly rotates at a speed determined by the speed of the propeller shaft 4.

The gears are shown in high in Fig. 42. When the handle is flicked towards the operator for a downshift from third to second speeds, for example, the transfer mechanism automatically takes the engine control away from the operator, transferring the throttle control from the accelerator to the governor. This synchronizes the engine and car wheels at third speed, after which the third speed gears (303 and 305) are disengaged with the clutch 2 still in engagement as shown in Fig. 43.

The coordinator then operates to speed up the engine to correspond to the car speed in second, synchronizing gears 303 and 311. The clutch 2 then disengages with the gears in neutral and the gears 303 and 311 then engage in second speed as shown in Fig. 44, the gears being automatically synchronized by the previous synchronizing operation at second speed. The clutch 2 then reengages, the clutch elements 300 and 301 being already synchronized corresponding to second speed, and the throttle control is then retransferred from the governor to the accelerator pedal.

Thus, the engine is synchronized in two stages, firstly, at third speed before the third speed gears are disengaged, and secondly, at second speed before the clutch is disengaged. This puts engine, clutch and the second speed gears all at second speed so that the second speed gears may engage, immediately followed by the clutch, with all meeting parts running at the same speed, engaging quietly and without shock.

With the exception of figures showing special conditions, as Figs. 4–6, 8, 13, 32 to 40, 43 and 44, and the various detail views, the drawings illustrate a vehicle with the change gears in "high" or third speed ratio, the clutch engaged, the accelerator pedal slightly depressed and the car rolling along a level road at about fifteen miles per hour.

*Down-shift from third to second speed*

Assuming that the car is approaching a sharp up-grade and it is necessary to shift the change gears from third to second speed, the operator swings the hand lever 50 towards himself in a simple rotative motion about shafts 57 and 58, and this action sets in motion all the mechanism to perform a complete gear shift without any further action by the operator, including the disengagement and reengagement of the clutch and the synchronizing of engine and car speed.

As hand lever 50 is swung towards the operator it causes arm 168 of lever 169 to swing to the right (Fig. 11) thereby moving control valve 155 to the right. The outer chamber of shift cylinder 12 is thus vented to atmosphere through pipe 182 by the alignment of ports 178, 156 and 175, and the inner chamber is connected to vacuum through pipes 183 and 181 by the alignment of ports 179, 158, 157 and 177. The clutch cylinder 11 and engine speed control vacuum box 139 are both connected to vacuum through pipes 184, 185 and 140 by the alignment of ports 180, 157 and 177. The lug 187 on the end of valve 155 is moved to the right (Figs. 14 and 15) out of the path of the lug 188 on the cam block.

While the application of vacuum to the three vacuum chambers 11, 12, 139 is simultaneous, the different construction of each and their relative sizes is such that their action takes place in successive steps but, in a quick, smooth and substantially continuous operation.

Due to the relatively small size of the vacuum box 139 and its weak spring it is the first to act upon the application of vacuum to the mechanism and, as it collapses, the control of the engine speed is taken away from the foot accelerator and transferred to the governor, which, in the case under consideration, has set its associated parts in positions in accordance with a car speed of fifteen miles per hour. Thus, the engine speed transfer mechanism 73 is under control of the governor and by the links 75 and 78, sets the main throttle 81 to produce an engine speed corresponding to car speed.

The synchronizing of engine and car speed removes substantially all torque through the clutch and change gears so that very little effort is required to unmesh the gears. This feature of the invention permits the gears to be unmeshed and set in their neutral position before the disengagement of the clutch.

Immediately following the synchronizing of engine and car speed the cam block 190, which became free to act by the shifting of valve 155 and lug 187 thereon, is moved inwardly towards its second speed position by the vacuum applied to shift cylinder 12. As explained above, this movement takes place in two steps, and it is the initial half of this movement which shifts the change gears from their third speed position to transitory neutral. During the initial half-movement of the cam block 190 the slide block 235, contained within the cam block, is not free to move with it, as yet, due to its lugs 238 (Fig. 16) being in contact with the side faces of lugs 224 on the clutch bar 218. The action of clutch cylinder 11 is slightly slower than cam block cylinder 12 due to the inertia of clutch and cylinder. Consequently, clutch bar 218 only acts to release slide block 235 after the cam block has been momentarily brought to rest at the half way point of its movement towards second speed position by the end of the passageway 236 striking the slide block 235. The clutch bar 218 does not complete its movement until after the gears are synchronized for second speed operation, as explained below.

The change gears are shifted from their third speed position to neutral during the initial half-movement of cam block 190, and before disengagement of the clutch, by the action of cam slot 192 (Fig. 29) acting upon cam bar 194 as previously described. The first-reverse gears remain in neutral since cam slot 191 is so shaped as not to affect these gears during the third-to-second shift.

Before the meshing of the gears in second speed is completed, it is desirable to increase the engine speed to correspond to the assumed car speed of 15 miles per hour as represented by the second speed gear ratio, and the slight normal lag in engine speed pick-up as the throttle is opened permits of the use of the initial half-movement of cam block 190 to institute the operation for change in engine speed.

The operation of speed coordinating plate 151 and fulcrum pin 150 to change engine speed takes place during the initial half-movement of the cam block in any shift cycle, but the engine speed, due to the normal lag in "pick-up," is not fully synchronized with car speed in the ratio to which it is being shifted, until the clutch is almost fully disengaged.

Referring to Figs. 30 and 31, considering the coordinator, as the cam block 190 starts its movement, the spring ball 256, carried thereby, moves along recess 252 in plate 151 until it strikes the inner end of the recess, the plate being held stationary during this movement by the leaf spring 251 on the cam block. The purpose of this lost motion is the need for a shorter length of movement of coordinating plate 151 than the length of movement of the cam block 190. This shorter movement of plate 151, and hence fulcrum pin 150, is necessary between a third and second speed shift and not between a second and first speed shift due to the relative difference in engine speeds under these two gear ratio conditions.

As the ball 256 strikes the end of recess 252, the continuing movement of the cam block 190 carries with it the plate 151, and the fulcrum pin 150 is moved along slot 148 in lever 147 thereby moving slide sleeve 145 and opening the throttle 81 to increase engine speed the proper amount (see also Fig. 13).

The change gears are now in transitory neutral and the engine throttle is set for running at a speed corresponding to second speed ratio for a fifteen mile per hour car speed. The disengagement of the clutch preparatory to meshing the gears in second speed position now takes place.

Referring to Figs. 14 and 16, just previous to the momentary halting of the cam block 190 by the slide block 235 at the end of its initial half-movement, the applied vacuum in clutch cylinder 11 starts the clutch bar 218 moving to clutch disengaging position. The stop block 225, mounted on the clutch bar 218, moves with the bar, and, as the bar approaches the end of its movement, the upper arm 229 of stop block 225 seats itself in the recess in tooth 258, formed on the under side of coordinating plate 151, thereby holding the plate in its second speed position until the final half-movement of the cam block has been completed. Following the locking of coordinating plate 151 in second speed position, the lugs 224 on the clutch bar complete their movement out of the path of lugs 238 in the slide block 235, freeing the latter and the cam block for the final half-movement of the cam block, and, at the same time, the clutch bar disengages the clutch 2.

The cam block and slide block, being thus free to move, do so, and shift the change gears into their second speed position by action of the cam groove 192.

The cam block and slide block are brought to rest in second speed position by the lugs 240 (Fig. 32) in the slide block striking the arms 229 on stop block 225. At the instant the cam block comes to rest, the space between the lugs 188 and 189 on the upper face of the cam block is opposite the lug 187 carried on the end of the control valve plunger 155, and the latter, under the influence of its spring 162, moves back to its central, or normal, position, causing, at the same time, the re-setting of hand lever 50 in its central position.

During the final half-movement of the cam block and slide block, the accidental engagement of the clutch 2 is prevented by the lugs 238 on slide block 235 passing laterally into the path of possible movement of lugs 224 on the clutch bar 218 thereby preventing movement of the clutch bar until the cam block has completed its gear meshing movement, at which time lugs 238 are no longer in the path of movement of lugs 224.

Figure 32:
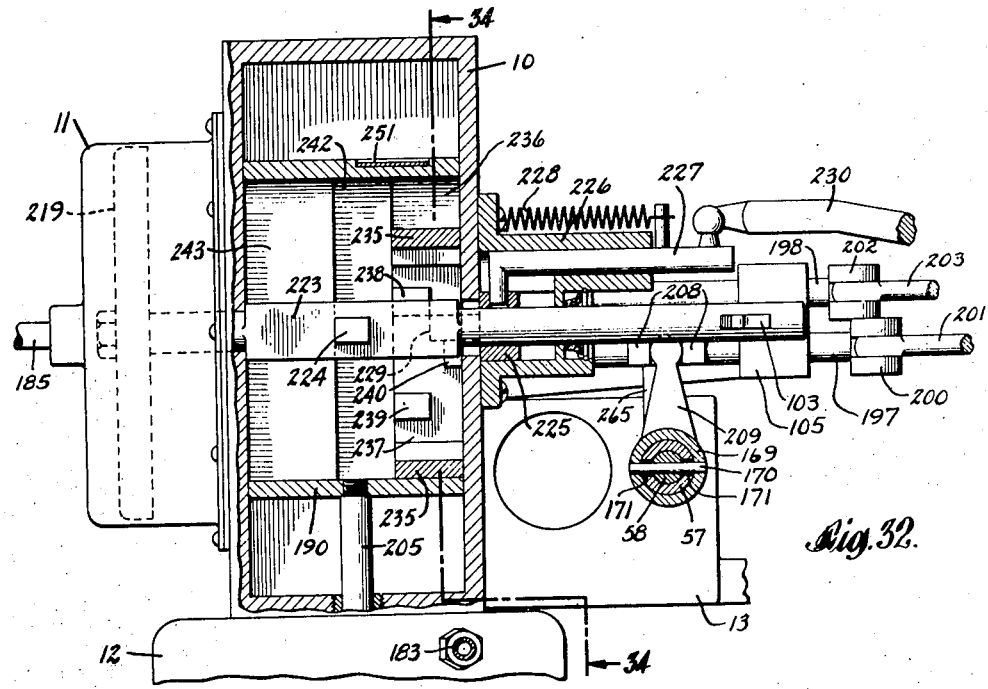
Fig. 32 is a plan section similar to Fig. 16 but showing the parts in the position they assume at the end of a "down-shift" from third to second speed but just previous to the reengagement of the clutch.
Figure 34:
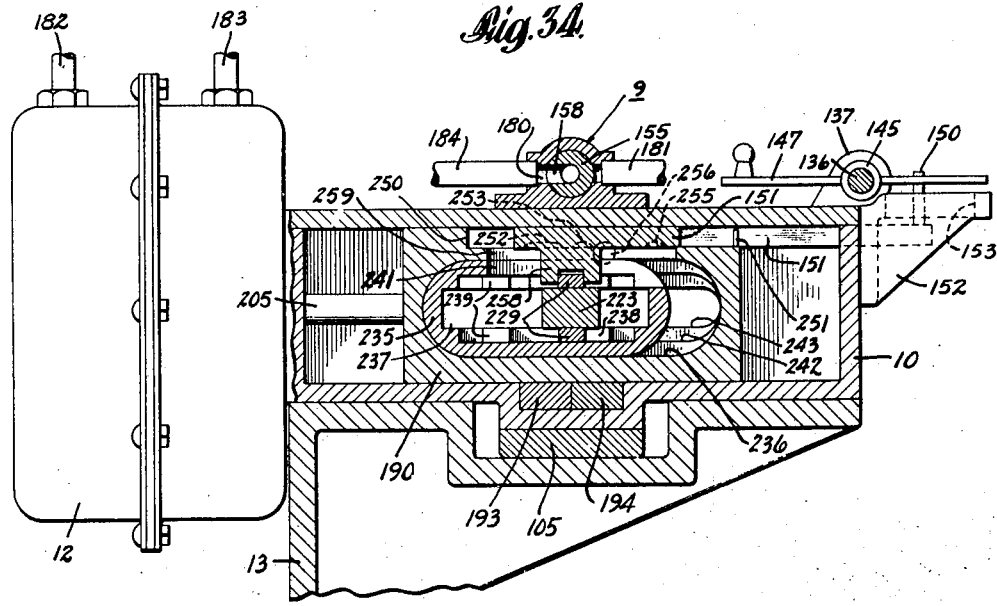
Fig. 34 is a transverse section taken on the line 34—34 of Fig. 32.

Also during the final half-movement of the cam block, during which the plate 151 is prevented from moving, the spring ball 256 (Fig. 30) slips out of recess 252, jumps through recess 253 and comes to rest in recess 254 ready for the next cycle. Figs. 32 and 34 illustrate the position of parts at this point in the operation cycle, the clutch being still disengaged.

As the control valve plunger 155 returns to central position, all of the vacuum lines to the several cylinders are vented to atmosphere (Fig. 11), and the clutch 2 is re-engaged as clutch bar 218 is moved to its original position by the spring 220 in clutch cylinder 11 and springs in the clutch 2. Stop block 225 is moved out of engagement with tooth 258 on coordinating plate 151 and out of the path of lugs 240 in the slide block 235. The re-engagement of the clutch takes place with a minimum of slippage or shock because the engine speed and car speed were synchronized. Admission of atmosphere to vacuum box 139, as the control valve plunger 155 is centralized, completes the shift cycle by transferring the engine speed control from the governor back to the foot accelerator. The car is now in second speed ratio and under full control of the operator.

*Down-shift from second to first speed*

Assuming, now, that the up-grade along which the car is proceeding necessitates a further shifting of the gears into their first speed position, the operator again swings the hand lever 50 towards himself from its central position in a simple rotative motion.

The control valve plunger 155 assumes the same position described in the previous operation and the various parts react in substantially the same manner with the following exceptions.

The lug 187 on the valve plunger 155 co-acts with lug 189 on the cam block instead of with lug 188 (Fig. 15).

The cam block 190 and slide block 235 move together during the entire movement, with the lugs 239 in the slide block serving to halt the cam block momentarily in mid-movement as they meet lugs 224 on the clutch bar 218 (Fig. 32). The lugs 239 also serve in this cycle the same purpose as lugs 238 in previous cycle in preventing accidental re-engagement of the clutch before a shifting cycle is completed.

Figure 33:
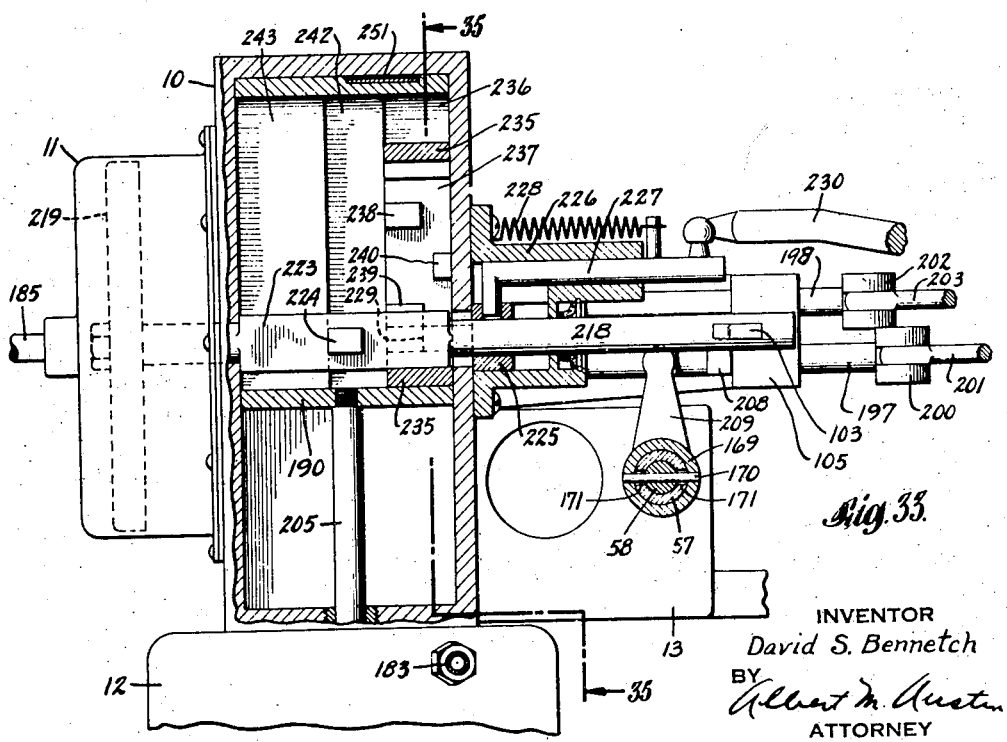
Fig. 33 is a plan section similar to Fig. 16 showing the parts in the position they assume at the end of a "down-shift" from second to first speed but just previous to the reengagement of the clutch.

The cam block is brought to rest at the end of its full movement by the end wall of the cam box 10 instead of by lugs 240 in the slide block (Fig. 33).

The speed coordinating plate 151 travels with the cam block during the latter's entire initial half-movement in this cycle, since the recess 254 (Fig. 30), in which the ball 256 is seated, incorporates no lost motion. During the final half-movement of cam block, when the pin 150 reaches the end of slot 153, the ball jumps from recess 254 to recess 255 to be ready for the next cycle, the plate, as before, being held stationary during this movement by engagement of tooth 258 with arm 229. There is no necessity for the provision of lost motion in the plate 151 in a shift between second and first speeds because the full half-movement of cam block is required to properly synchronize engine speed with car speed between these ratios.

Figure 35:
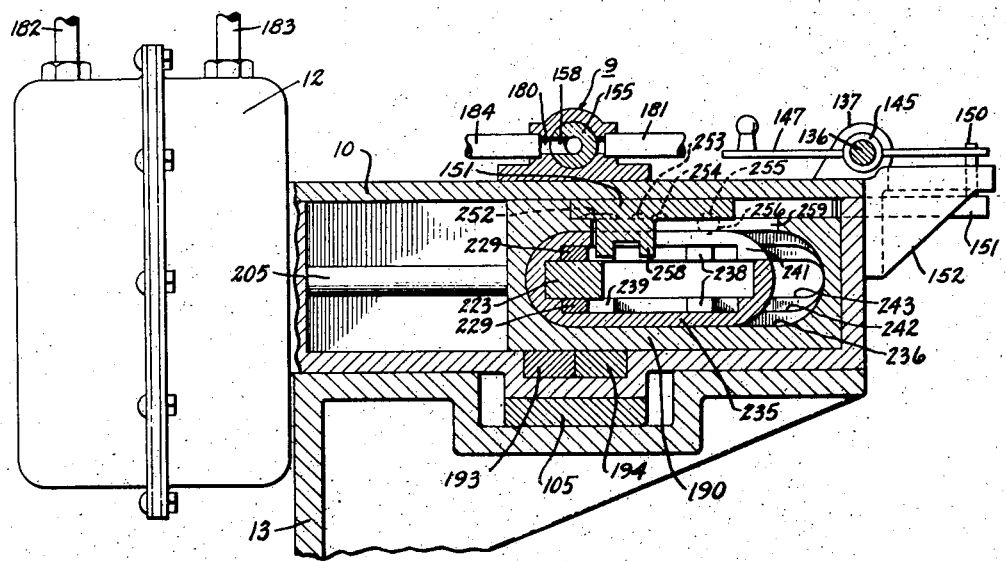
Fig. 35 is a transverse section taken on the line 35—35 of Fig. 33.

Figs 33 and 35 illustrate the positions of the parts at the end of a shift cycle from second to first speed just previous to the re-engagement of the clutch

*Up-shift from first to second, and from second to third*

As the top of the up-grade is approached, the operator may, when desired, shift the gears to the next higher ratio, such as first to second speed, by swinging in a simple rotary movement the hand lever 50 from its central position away from himself (towards the front of the car). The control valve plunger 155 is thereby moved from its central position to its forward position (left in Fig. 11). In this case the inner chamber of shift cylinder 12 is vented to atmosphere through pipe 183 and ports 179 and 176, air passing around the reduced portion of valve stem 161 which has moved to a point opposite these ports. Vacuum is applied to the outer chamber of cylinder 12 through pipe 181, ports 177, 159, 158 and 178 and pipe 182, thereby activating the cam block 190 in the reverse direction (outwardly) to that previously described. Vacuum is applied to the clutch cylinder 11 and transfer vacuum box 139, enabling them to perform their normal functions, by the aligning of ports 177, 159 and 180 and thru pipes 184, 185, 140.

The movements of the cam block 190 and slide block 235 are the same, in reverse direction, as that already described in the shift from third to second speed. In this shift, however, the coordinating plate 151 has no lost motion and partakes of the full first half motion of the cam block to transitory neutral, since, as previously pointed out, none is needed in a shift between first and second speed.

When the cam block makes its second half-movement to complete the gear shift from first to second and the movement of coordinator plate 151 is arrested by engagement of arm 229 on stop block 225 engaging notched tooth 258, the spring pressed ball jumps from notch 255 to notch 254.

It is to be understood, of course, that lugs 239 in slide block 235 perform, in an up-shift, the function which lugs 238 perform in a down-shift, due to the change in direction of cam block movement.

The operation of the clutch actuating mechanism, the engine speed transfer mechanism and the synchronizing of engine and car speed previous to clutch re-engagement, is the same as that already described.

When the car has reached the proper speed for shifting from second speed to third, the operator again swings the hand lever 50 away from himself from its central position for an up-shift, thereby again setting the valve plunger 155 in the up-shift position just described. The sequence of events within cam box 10 repeat themselves, in reverse direction to that described in the down-shift from second to first speed with the exception that the coordinating plate 151, having no need in this shift for the full movement which the cam block might impart to it, is brought to rest by the fulcrum pin 150, on the plate, striking the end of the slot in bracket 152.

This takes place just before the cam block reaches the end of its initial half-movement, and, as the cam block completes its initial half-movement, the spring ball 256 moves from recess 254 to recess 253. The seating of the ball in recess 253 serves to hold plate 151 against further movement during the clutch disengaging operation since in the particular position of plate 151 here described the recess in tooth 258 of the plate is not in a position to be engaged by the upper arm 229 of the stop block 225 as the latter moves forwardly during the declutching operation. The final half-movement of the cam block in this cycle serves, first, to flex the leaf spring 251 against the shoulders on plate 151, then move spring ball 256 from recess 253 to the outer end of recess 252 in the plate 151.

The control valve plunger 155 is then automatically returned to central position, the hand lever 50 is returned to central position, the clutch is re-engaged and the engine speed control is returned to the foot accelerator, thus bringing all the parts into their third speed positions, as illustrated in the main figures of the drawings.

*Skip shift*

If the operator desires, for any reason, to shift the gears from third speed to first, or, first to third, thus skipping the second speed, he may do so. Shifting from third to first, for example, he first steps on the clutch pedal 93, thereby directly disengaging the clutch 2 by pedal arm 96 and link 97 (Figs. 1 and 2). The lost motion slot in the end 101 of curved link 100 permits this manual clutch disengagement without affecting the cam box mechanism. The pivot pin in the end of pedal arm 96 moves to the end of the slot 231 in the link 230 connecting the arm 96 to the stop block retarding rod 227 (Fig. 16), thereby holding the stop block 225 in its retracted position.

The hand lever 50 is next swung for a down-shift, and the sequence of events is similar to that already described for an automatic down-shift, with the exception that, since the stop block 225 has been rendered inoperative, the cam block 190 does not stop its motion at its second speed position but continues on to its first speed position, thus shifting the gears, in order, from third, to neutral, to second, to neutral, to first. It is necessary, during this shift, that the operator hold both the clutch pedal and the hand lever in their operative positions until the shift cycle has been completed by manual re-engagement of clutch.

For an up-shift skip operation, the clutch pedal is depressed and the hand lever 50 swung for an up-shift, thereby shifting the gears from first speed to neutral, to second, to neutral, to third, the movements of the cam block and slide block occurring in the same order as that already described for an automatic up-shift with the exception that, again, the stop block 225, haivng been rendered inoperative by the manual operation of the clutch, fails to stop the cam block in its second speed position and it therefore comes to rest in its third speed position.

It is to be noted that in the skip shift the clutch cylinder operation proceeds in the same manner as during a normal automatic shift operation but does not affect the operation of the clutch because the latter was disengaged and reengaged manually. The operation of the engine speed control transfer and synchronizing mechanism 73 is also similar to that in a normal semi-automatic shift.

SHIFTING TO AND FROM NEUTRAL

The shifting of the change gears into their neutral position when the car has been brought to a stop, such as for parking, for storing in garage, or stopping an appreciable time at a red light, is a manual operation. The gears are first shifted to their first speed position, either by the automatic normal down-shift or the skip shift operation already described. The cam block 190 being thus in its first speed position, has its cam slots 191, 192 (Fig. 29) in such position whereby the cam bars 193, 194 are free to be manually moved to any of their positions. As the cam block moved into this first speed position, the second and third speed gears were automatically shifted into their neutral position and it only remains to shift the first speed gears from first to neutral position.

To put the car in neutral, the operator first depresses the clutch pedal 93 to disengage the clutch. The operator then raises the hand lever 50 (Fig. 7), then swings it toward himself as in a down-shift, then, while it is still raised, swings it back to central position and releases it. As the hand lever is raised, the shaft 58 and lever 169 secured thereon, move downwardly, disengaging the upper arm 168 of lever 169 from the notch 167 in control valve stem 161 (Figs. 7, 11 and 14). The lower arm 209 strikes the top surface of one of the lugs 208 on shift rod 197 (Fig. 29) and, as the hand lever 50 is swung towards the operator, the effort to raise it still being exerted, the arm 209 is forced into the space between the two lugs 208. The hand lever 50 then, in its swing back to central position while still raised, carries with it the shift rod 197, thereby shifting the first speed change gears into neutral. The release of hand lever 50 then permits spring 172 to return the hand lever to its normal, central, "down" position. The clutch pedal 93 is then released, causing the clutch 2 to engage. The car is now in neutral.

When it is desired to start the car either in first gear or reverse after a stop in neutral, a manual gear shift operation is necessary. The clutch pedal 93 is depressed to disengage the clutch. The hand lever 50 (Fig. 7) is then raised, disengaging upper lever arm 168 from valve stem 161 and engaging lower arm 209 between the lugs 208 on first and reverse shift rod 197. With hand lever still raised, it may be swung either forwardly to mesh the reverse gears or rearwardly to mesh the gears in first speed. The hand lever is then lowered, disengaging lower arm 209 from lugs 208 and bringing upper arm 168 in contact with the underside of valve stem 161. It is then returned to central position by the operator, the upper arm 168 thereby engaging at the end of its movement, the recess 167 in the valve stem. The clutch pedal is then released to reengage the clutch as the engine is accelerated and the car moves forward or backward as the case may be. Subsequent shifting of the gears from first to second and third speed may be accomplished in the manner already described.

CHANGEOVER TO FULL MANUAL OPERATION

The control as above described is full manual only between neutral and reverse or first speed. Between first, second and third, either up-shifting or down-shifting, the control is semi-automatic, in that, all shifting is accomplished merely by flipping hand lever 50 forward or backward, depending upon whether an up-shift or a down-shift is desired.

If for any reason it is desired to eliminate the semi-automatic shift and use straight conventional hand shifting at all speeds, this may be done. Figs. 8 and 9 show how, by the simple insertion of a pin, the semi-automatic construction of Fig. 7 may be changed over to full manual shifting.

Referring to Figs. 7-10, the lever 265 normally moves free on hollow shaft 57 when shifting is semi-automatic as indicated in Fig. 7. To change over from semi-automatic to full manual, pin 266 is inserted in a hole in shaft 58 as shown in Figs. 8-10. The lever 265 has upon the upper face of its hub a boss in which a groove 267 is formed to receive the projecting ends of pin 266. Extending downwardly from the groove 267 and formed in the surface of the hole in the lever hub are flared recesses 268 (Fig. 10). Clearance slots 269, provided in that portion of hollow shaft 57 adjacent the lever hub, permit the pin 266 to move vertically therein during certain operations. The end of lever 265 passes beneath push rod 197 and is seated between a pair of depending lugs 270 on the second-third speed push rod 198.

To eliminate the semi-automatic features of the mechanism and use only manual shifting, the gears are set in neutral. This brings the broadened ends Y and X of the two cam grooves 191, 192 (Fig. 29) in line with cam rollers 195, 196 which thus allows rods 197 and 198 to be moved into any of their shift positions without affecting the cam box mechanism. The vacuum system is then rendered inoperative by closing stop cock 275 (Fig. 2) in vacuum line 181.

The operator then raises the spring 172, between levers 169 and 265, and inserts the pin 266 through slots 269 in hollow shaft 57 into the hole provided in shift rod 58 so that the ends of the pin lie in the groove 267 where it is held upon the operator's release of spring 172. Thus, it will be seen, a simple rotation of the hand lever as it turns shift rod 58 will reciprocate push rod 198 so as to shift the second and third speed gears to their various positions.

When it is desired to shift to either first or reverse, the second-third speed push rod 198 is set to its neutral position by the hand lever 50 and the lever then raised, thereby lowering shift rod 58 and bringing the lower arm 209 of lever 169 into engagement with the lugs 208 on first-reverse speed push rod 197. The pin 266 moves downwardly with the rod 58, sliding through the slots 269 in hollow shaft 57, and comes to rest in the widest portion of the flared recesses 268 in the hub of lever 265. The operator can then swing hand lever 50 (while still holding it up) either backward or forward to set the first or reverse gears in the desired position without transmitting that oscillation to the lever 265.

SPEED LIMITING THROTTLE

Referring to Figs. 1, 2 and 36 to 40, if desired, there may be incorporated in the throttle valve casing 8, in addition to the main throttle 81, a speed limiting throttle 280, the purpose of which is to discourage the operator from driving at excessive speeds except during emergency conditions of comparatively short duration when such speeds may be desirable or necessary.

The limiting throttle 280 is pivoted at 281 in the valve casing 8 between the main throttle 81 and the carburetor 7. The pivot pin 281, outside of the casing 8, has secured thereto a lever 282 which carries a weight 283 that may be adjustably positioned on the lever. Pivotally attached to the long arm of lever 282, as by a pin and slot 284, is the forked end of a piston 285 which is reciprocable in a fluid pressure cylinder 286 mounted upon the casing 8. A pipe 287 connects the lower end of cylinder 286 to the cylinder 22 (Fig. 3) of the governor 20 at a point in back of piston 127 whereby the oil pressure in cylinder 22 is transmitted to the piston 285.

As previously described, the pressure of the oil in cylinder 22, and hence in cylinder 286, is directly proportional to car speed. By setting the weight 283 on throttle lever 282 at a pre-selected point, the action of the varying oil pressure against piston 285 is modified so that lever 283 is moved only when the pressure exceeds the pre-selected amount, as, for instance, a pressure representing a car speed of fifty miles per hour. Thus, when this pressure is exceeded, the piston 285 moves upwardly and tends to close limiting throttle 280, thereby slowing the car speed. This, in turn, reduces the oil pressure against piston 285 and weight 283 causes throttle 280 to open again until the car again exceeds the limit of fifty miles per hour. As long as the car speed is kept under fifty miles per hour, the speed limiting throttle 280 is maintained in its full open position.

Means are provided, associated with the foot accelerator 65 and main throttle 81, whereby the governor control of the speed limiting throttle 280 may be transferred, at will of the operator, to the foot accelerator 65 so as to obtain speeds in excess of the selected speed limit, as, for instance, when passing another car in the same direction and an approaching car suddenly appears to cut down the available time for passing.

As embodied, a conical compression spring 288 is secured on the floor board 67 of the car beneath the accelerator pedal 65 and is so proportioned that pedal 65 does not contact the spring during its movement from A to B, or while main throttle moves from its idling position D to its maximum fuel feed position. A projection 290, formed on main throttle lever 79, is adapted, at certain stages of operation, to contact the short arm of the limiting throttle lever 282. The proportion of the parts is such that projection 290 contacts lever 282 when limiting throttle 280 is closed (position H, Fig. 39) with main throttle 81 open at maximum fuel speed position E and the pedal 65 at position B (Fig. 36).

It is desirable that the strength of spring 288 be such that a distinctly uncomfortable strong effort of the operator is required to compress it, thereby discouraging the continued compression of the spring and hence driving in excess of the set speed, for example, of fifty miles per hour.

Referring to Fig. 36 and assuming that weight 283 has been set to limit car speed at fifty miles per hour, the main throttle 81 is shown, in solid lines, at idling speed position D, and limiting throttle 280 is shown at maximum fuel feed position G (equivalent, for example to a speed of ninety miles per hour on a level road). As the operator depresses pedal 65 from A to B, the main throttle 81 moves from D to E and the car accelerates. As the car passes, by a slight amount, the fifty miles per hour speed, the governor causes an increase in oil pressure in cylinder 286 sufficient to overcome weight 283 and the limiting throttle lever 282 is rotated to move limiting throttle 280 towards its closed position H. Before the throttle can reach this position, however, the car has reduced its speed and, as the speed drops a little under 50 miles per hour, the corresponding reduction in oil pressure permits weight 283 to urge the throttle open again. Thus, as long as the operator holds the pedal 65 at position B a balance is maintained between the oil pressure from the governor and the weight 283 thereby maintaining car speed at 50 miles per hour. Any attempt of the car to exceed 50 miles per hour is immediately counteracted by a closing of the limiting throttle 280.

If an emergency now arises and the operator wishes to increase the speed over 50 miles per hour, he depresses pedal 65 from position B towards C thereby compressing spring 288 and causing projection 290 on lever 79 to strike, at some point in its travel, the short arm of limiting throttle lever 282. Continued movement of pedal 65 then opens limiting throttle 280, against oil pressure, to any desired position up to maximum fuel feed position G, thereby permitting the car to reach any speed of which is it capable. The maintenance of this excessive speed beyond the need of the emergency is greatly discouraged, however, by the comparatively great effort required of the operator to keep the spring 288 compressed. The movement of main throttle 81 from position E to F during pedal movement from B to C represents lost motion in so far as engine speed is concerned.

When the operator completely releases pedal 65, the main throttle 81 resumes its idling position D under influence of spring 74, 82, and when the car, thus deprived of sufficient fuel, slows to less than 50 miles per hour, the limiting throttle 280 moves to full open position G through the influence of weight 283 and reduced oil pressure, and car speed is again under full control of main throttle 81.

If, in descending a hill, the car exceeds a speed of 50 miles per hour, even though the main throttle 81 is only partially open, the limiting throttle 280 will move towards its closed position and retard the speed of the car to 50 miles per hour in the manner already described, provided, of course, that the grade is not so steep as to overcome engine compression built up by a closed throttle.

In ascending a grade, such as will require the full power of which the engine is capable, the operator may depress pedal 65 to position B and thereby open main throttle 81 to maximum fuel feed position E. So long as the car does not exceed the selected speed limit, the engine is thus able to deliver its full power.

Fig. 41 shows a modified form of accelerator pedal control which may be provided, if desired, to prevent, rather than discourage, any car speed in excess of a selected limit. Thus, if it is desired to prevent the operator, under any circumstances, from driving in excess of the selected speed limit, such as 50 miles per hour, a fixed stop 291 may be substituted for the spring 288 whereby the pedal 65 can only be depressed to position B, or an amount sufficient to move main throttle 81 to maximum fuel feed position E. With this arrangement the pedal 65 cannot be depressed below point B and hence, cannot act to effect any change in position of the limiting throttle 280 as determined by car speed. Thus, when the car speed exceeds 50 miles per hour by a small amount, the limiting throttle acts, by reason of the governor, to retard it, and since the pedal 65 cannot be depressed below point B the projection 290 on the main throttle lever cannot act to open the limiting throttle beyond the point at which the governor sets it. Hence, the car speed can at no time exceed the selected limit in this instance.

Thus, it will be seen that the speed limiting device consisting of the centrifugal governor which is responsive to car speed and the two fuel controlling throttles operably connected thereto comprises a mechanism which needs no adjustments to compensate for a sluggish or finely "tuned" engine or for changing fuel mixtures, road conditions or weather variations. It is responsive to one thing only, car speed, and only functions to limit that speed at the precise point, within narrow limits, for which it is set and has no effect on normal operation until the selected speed limit has been reached.

COMMENTS AND ADVANTAGES

Thus, a semi-automatic gear shifter is provided by which a conventional automobile may be shifted, at the will of the operator, from any speed to any other speed. The only voluntary action required by the operator is the flicking of the small hand lever and it is not necessary, ordinarily, to select speed. A simple flicking of the lever forwards automatically places the car in the next higher speed and simple flicking of the lever backwards automatically places the car in the next lower speed, the gear shifting and clutch operation being entirely automatic when once the shifting cycle is set into operation.

The synchronizing provides not only smooth operation, but also speedy completion of the shifting cycle. The disengagement of the "old" gears does not have to await disengagement of the clutch. At the same time, the second stage of synchronizing action synchronizes the "new" gears and also the clutch elements so that engagement of the new gears and of the clutch takes place without shock.

Complete interlock is obtained both between the hand lever and the gears and between the gears and the clutch. It is impossible for the gears to disengage without operation of the hand lever. It is furthermore impossible for the gears to reengage without the clutch disengaging, and the clutch cannot reengage until after the gears reengage.

The special hydraulic governor control provides a large mechanical advantage with a small governor and at the same time converts the undesirable speed characteristics of the ordinary centrifugal governor to make the idling speed of the engine closely proportional to the speed of the car.

The provision of the skip shift, from either third to first or from first to third, is an advantage when this action is desired on special occasions. Here it is only necessary for the operator to depress the clutch pedal and to hold the hand lever in displaced position until the shift is completed.

At the same time, if for any reason, it is desired not to use the semi-automatic shift, the function of this apparatus may be omitted and by a simple change the car may be converted into an ordinary full manual gear shift control.

The safety maximum speed control is of advantage in effectively limiting the speed of the car. At the same time control of car speed is not completely taken away from the operator, but by making a simple but uncomfortable exertion, the operator can temporarily take over complete control of the car long enough to extract it from any emergency situation, speeding the car up over the set safety limit if necessary. But the uncomfortable exertion necessary to remove the governor control is sufficient to discourage an operator from driving at excess speed for any period other than a short duration.

While certain novel features of the invention have been disclosed and are pointed out in the annexed claims, it will be understood that various omissions, substitutions and changes may be made by those skilled in the art without departing from the spirit of the invention.

What is claimed is:

1. In an automotive vehicle, an engine having a carburetor and throttle, a propeller shaft having a speed governor, an operator's control element, a transfer mechanism for shifting control of said throttle between said operator's element and said governor, said transfer mechanism having a vacuum chamber, said transfer mechanism having normally lost motion connection with said governor and a normally operative connection with said operator's element, means actuated by applying vacuum to said chamber for converting said normally lost motion connection to an operative connection, and for converting said normally operative connection to a lost motion connection.

2. In an automotive vehicle, an engine having a carburetor throttle, a propeller shaft having a speed governor, an operator's control element, a transfer mechanism having connections with said throttle, control element and governor, said transfer mechanism comprising a rod having a shoulder and a reduced spindle, a vacuum box having a flexible head secured to said spindle and also having a rigid head, a transfer sleeve on said spindle having a shoulder and connected to said rigid head, said control element being disposed between said transfer sleeve and flexible head, a slidable sleeve on said spindle operating between said shoulders and having a slot, said spindle having longitudinal slots, a lever passing through one of said spindle slots and said sleeve slot, a pin passing through said other spindle slot, through said lever and through said slidable sleeve, a support for said transfer mechanism, and a pivot connection between said support and said lever, said lever extending to said governor and said rod extending to said carburetor, said vacuum head being ordinarily expanded under said spring and said slidable sleeve being free on said spindle, whereby said governor imparts no movement to said rod, a flexible vacuum line connected to said vacuum head, whereby, upon application of vacuum, said head collapses and said slidable sleeve is clamped between said shoulders and said operator's control element imparts no movement to said transfer mechanism.

3. In an automotive vehicle, an engine having a speed control, a propeller shaft having a speed governor, an operator's control element, a transfer mechanism having connections with said speed control, control element and governor, said transfer mechanism comprising a rod having a shoulder and a reduced spindle, a vacuum box having a flexible head secured to said spindle and also having a rigid head, a transfer sleeve on said spindle having a shoulder and connected to said rigid head, said operator's control element being disposed between said transfer sleeve and flexible head, a slidable sleeve on said spindle operating between said shoulders and having a slot, said spindle having longitudinal slots, a governor member passing through one of said spindle slots and said sleeve slot, a pin passing through said other spindle slot through said governor member and through said slidable sleeve, a support for said transfer mechanism, said governor member extending to said governor and said rod extending to said engine speed control, said vacuum head being ordinarily expanded under said spring and said slidable sleeve being free on said spindle, whereby said governor imparts no movement to said rod, a vacuum line connected to said vacuum head, whereby, upon application of vacuum, said head collapses and said slidable sleeve is clamped between said shoulders and said operator's control element imparts no movement to said transfer mechanism.

4. In an automotive vehicle, an internal combustion engine having a carburetor and a throttle, a propeller shaft having a speed governor, an operator's throttle control element, a transfer mechanism between said throttle control element, governor and throttle, whereby said throttle is normally under the control of said element and said governor is normally ineffective, a coordinating mechanism comprising a support having a slot, a coordinator plate having a member slidable in said slot, a coordinator lever having a slot about said member, said transfer mechanism comprising a rod, said support having guides for said rod, causing said rod to be movable transversely to said slot, gear shifting mechanism operatively connected to said coordinating plate, whereby said pin moves in said slots to provide different effective fulcrum points for said lever according to the particular gear ratio, said coordinating lever extending to said governor.

5. In a safety speed limiting device for automotive vehicles, an internal combustion engine having a carburetor, a main throttle valve and a normally open safety throttle valve, a vehicle driving element driven by said engine, an accelerator pedal, a linkage between said accelerator pedal and said normal throttle for normally controlling the speed of the car, a governor driven by said driving element, a linkage between said governor and said safety throttle whereby said governor closes said safety throttle when a predetermined upper speed limit is reached, said accelerator having a normal range of relatively free movement, an emergency spring deformable by movement of said accelerator pedal beyond said normal range into the emergency range, connections between said thottles whereby movement of said accelerator in said emergency range opens said safety throttle against the governor control.

6. In a safety speed limiting device for automotive vehicles, an internal combustion engine having a carburetor, a main throttle and a normally open safety throttle, a vehicle driving element driven by said engine, an accelerator pedal, a connection between said accelerator pedal and said main throttle for normally controlling the speed of the vehicle, a governor driven by said driving element, a connection between said governor and said safety throttle whereby said governor closes said safety throttle when a predetermined upper speed limit is reached, said accelerator having a normal range of relatively free movement for normally operating said main throttle, a stiff safety spring deformable by movement of said accelerator pedal beyond said normal range into the emergency range, connections between said accelerator and said safety throttle, whereby said safety throttle is opened against the governor control when said stiff spring is deformed, said safety spring requiring the operator to apply an uncomfortably high pressure on said pedal to deform the spring.

7. In a transmission, a prime mover, a load shaft driven by said prime mover, a disengageable power transmitting device between said prime mover and load shaft, a governor responsive to the speed of said load shaft, a prime mover control, an operator's control member, a transfer device comprising a first member connected to said prime mover control, a second member connected to said operator's control member, a third member connected to said governor, a sleeve member slidable on said first member, said first member having first and second abutments, mechanism for operating said disengageable device, said mechanism also operating said sleeve member to selectively clamp said second member against said first abutment or said third member against said second abutment, whereby to transfer operation of said prime mover control between said operator's member and said governor, and means for mounting said first member for lengthwise movement, said second, third and sleeve members having movement lengthwise of and relative to said first member.

8. In an automotive transmission, a prime mover having a control device for controlling the speed thereof, a load shaft driven by said prime mover, a multiple position change speed device between said prime mover and said load shaft, a prime mover synchronizer for synchronizing said prime mover and said load shaft at each of a plurality of change speed positions, said synchronizer comprising a velocity-responsive governor responsive to change in speed of said load shaft, connections between said governor and said control device to place said control device under regulation by said governor to make the speed of said prime mover correspond to the speed of said load shaft, a co-ordinating device for changing the range of regulating movement of said control device in response to any given variation in the speed of said load shaft, interlocking connections between said co-ordinating device and said co-ordinating change speed device whereby said co-ordinating device takes a position in accordance with the position of said variable speed device, shifting mechanism for completing a speed changing cycle, said mechanism putting said synchronizer into operation as a part of the speed changing cycle.

9. In an automotive transmission, a prime mover having a control device for controlling the speed thereof, a load shaft driven by said prime mover, a multiple position change gear variable speed device between said prime mover and said load shaft, a prime mover synchronizer for synchronizing said prime mover and said load shaft at each of a plurality of change speed positions, said synchronizer comprising a centrifugal governor responsive to change in speed of said load shaft, connections between said governor and said control device to place said control device under regulation by said governor to make the speed of said prime mover correspond to the speed of said load shaft, a coordinating device incorporated in said connections for changing the range of regulating movement of said control device in response to any given variation in the speed of said load shaft in accordance with the position of said variable speed device, automatic shifting mechanism for automatically completing a speed changing cycle, said mechanism putting said synchronizer into operation while the old gears are in engagement, then disengaging said old gears, then putting said synchronizer into operation for the new gears, and then engaging the new gears.

10. In a transmission, a prime mover having a control device, a load shaft, a disengageable power transfer device between said prime mover and said load shaft, disconnecting movement of said device being resisted by pressure due to torque, a velocity-responsive governor driven in proportion to the speed of said load shaft, disengageable connections between said governor and said control device, automatic mechanism for engaging said connections to synchronize the elements of said power transfer device to remove torque therefrom and thereafter disengaging said power transfer device after torque is removed therefrom, said automatic mechanism automatically completing the aforementioned cycle, after initiation thereof, independently of manual control.

11. In an automotive vehicle, an engine, a change gear transmission driven by said engine, a propeller shaft driven by said transmission, said transmission comprising selectively engageable gears selectively adapted to transmit load torque, gear changing mechanism for changing said gears, a synchronizer comprising a velocity responsive governor driven at a velocity proportional to the velocity of said propeller shaft, said synchronizer also comprising connections between said governor and said engine to regulate the speed of the engine in accordance with the speed of the propeller shaft, the above apparatus being so constructed and arranged that said gear changing mechanism automatically completes a gear changing cycle, after initiation thereof, independently of any manual operation, said gear changing mechanism controlling said synchronizer to remove torque from the engaged gears, said gear changing mechanism then changing the gears.

12. In an automotive vehicle, an engine, a change gear transmission driven by said engine, a propeller shaft driven by said transmission, said transmission comprising selectively engageable gears selectively adapted to transmit load torque, gear changing mechanism for changing said gears, a synchronizer comprising a velocity responsive governor driven at a velocity proportional to the velocity of said propeller shaft, said synchronizer also comprising connections between said governor and said engine to regulate the speed of the engine in accordance with the speed of the propeller shaft, the above apparatus being so constructed and arranged that said gear changing mechanism automatically completes a gear changing cycle, after initiation thereof, independently of any manual operation, said gear changing mechanism controlling said synchronizer to regulate the engine speed according to the ratio of the gears it is desired to engage, said gear changing mechanism then engaging said last mentioned gears to transmit torque.

13. In an automotive vehicle, an engine, a change gear transmission driven by said engine, a propeller shaft driven by said transmission, said transmission comprising selectively engageable gears selectively adapted to transmit load torque, gear changing mechanism for changing said gears, a synchronizer comprising a velocity responsive governor driven by said propeller shaft at a velocity proportional to the velocity of said propeller shaft, said synchronizer also comprising connections between said governor and said engine to regulate the speed of the engine in accordance with the speed of the propeller shaft, a coordinating device for changing the action of said governor on said engine with different gear ratios of said change gear transmission, the above apparatus being so constructed and arranged that said gear changing mechanism automatically completes a gear changing cycle, after initiation thereof, independently of any manual operation, said gear changing mechanism controlling said synchronizer to remove torque from the engaged gears, said gear changing mechanism then disengaging said engaged gears, said synchronizer then regulating the engine speed according to the ratio of the gears it is desired to engage, said gear changing mechanism then engaging said last mentioned gears to transmit torque.

14. In a drive for a motor vehicle having an engine; transmission mechanism operable to provide a drive from the engine to the vehicle, said mechanism including positively engageable drive-control elements, one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; a synchronizer adapted to synchronize said elements, said synchronizer comprising a speed-responsive governor driven in proportion to the speed of the vehicle a throttle on said engine, a connection between said governor and said throttle to variably open and close said throttle according to governor speed, said synchronizer thereby relieving said thrust application regardless of direction of torque transmitted, drive control means operable to urge movement of said movable element from said engaging relationship into said disengaging relationship; and means operating as an incident to operation of said drive control means for causing said synchronizer to function to relieve said thrust-application during said movement of said movable drive element from said engaging relationship into said disengaging relationship.

15. In a drive for a motor vehicle having an engine; transmission mechanism operable to provide a drive from the engine to the vehicle, said mechanism including positively engageable drive-control elements, one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; thrust-application relieving devices adapted to cooperate with said elements to relieve said thrust-application when said vehicle is driving said engine; drive control means operable to urge movement of said movable element from said engaging relationship into said disengaging relationship; and means operating as an incident to operation of said drive control means for causing said thrust-application relieving devices to function to relieve said thrust-application during said movement of said movable drive element from said engaging relationship into said disengaging relationship.

16. In a transmission, an internal combustion engine having a control throttle, a load shaft, a disengageable power transfer device between said engine and said load shaft, disconnecting movement of said device being resisted by pressure due to torque, a velocity-responsive governor driven in proportion to the velocity of said load shaft, engageable connections between said governor and said throttle to communicate the normal governing movement of the governor to the throttle and thus variably adjust it to various intermediate positions between open and closed positions, automatic mechanism for engaging said connections whereby the governing action of the governor operating upon the throttle synchronizes the elements of said power transfer device and maintains them in synchronism while said connections are engaged, regardless of direction of torque transmittal, whereby to remove torque from said power transfer device, said automatic mechanism thereafter disengaging said power transfer device, said automatic transmission automatically completing the aforementioned cycle, after initiation thereof, independently of manual control.

17. In an automotive transmission, an internal combustion engine having a control throttle, a load shaft for driving the vehicle, a change gear transmission between said engine and said load shaft, a synchronizer comprising a velocity-responsive governor driven in proportion to the speed of said load shaft, operating connections between said governor and said throttle to communicate the normal governing movement of said governor to said throttle and thus variably adjust it to various intermediate positions between open and closed positions whereby to synchronize gears of said transmission, mechanism for changing said gears, a coordinator incorporated in said connections for changing the ratio of throttle movement to governor movement and thus to obtain greater range of throttle movement at transmission ratios corresponding to lower vehicle speeds than at transmission ratios corresponding to higher vehicle speeds, with any given range in vehicle speed, and means tying said coordinator and gear-changing mechanism together whereby to operate said coordinator according to the gears to be changed.

18. In a power plant, a prime mover having a control device for controlling the speed of said prime mover, a load shaft, a multi-speed change gear transmission connecting said prime mover and said load shaft, a velocity-responsive governor driven in proportion to the speed of said load shaft, gear-changing devices for putting the gears of said transmission through a speed changing cycle, and means coordinated with said gear-changing devices for causing said governor to operate said control device to synchronize those gears of said transmission under torque load and then to synchronize those gears of said transmission which it is desired to subject to torque load, as a part of the same speed changing cycle from one speed to another.

19. In an automotive transmission, an internal combustion engine having a control throttle for controlling the speed thereof, a multi-speed change gear device driven by said engine, a load shaft driven by said change gear device, a synchronizer comprising a velocity-responsive governor driven in proportion to the speed of said load shaft, connections between said governor and said throttle to vary and maintain the speed of said engine in proportion to the speed of said load shaft while said connections are engaged, mechanism for changing said gears, a coordinating device between said gear changing mechanism and said synchronizer to change the ratio of throttle movement to governor movement, whereby a speed changing cycle is constrained to proceed in the following sequence: synchronizing the gears under load torque, disengaging said gears, synchronizing the gears which it is desired to subject to load torque, and engaging said last mentioned gears to complete the speed changing cycle.

DAVID S. BENNETCH.

REFERENCES CITED

The following references are of record in the file of this patent:

UNITED STATES PATENTS

| Number | Name | Date |
|---|---|---|
| 1,185,528 | Oddie | May 30, 1916 |
| 1,410,423 | Stevens | Mar. 21, 1922 |
| 1,702,721 | Charles | Feb. 19, 1929 |
| 1,706,739 | Moran | Mar. 26, 1929 |
| 1,751,303 | Boutet | Mar. 18, 1930 |
| 1,893,644 | Fleischel | Jan. 10, 1933 |
| 1,903,635 | Saives | Apr. 11, 1933 |
| 1,956,601 | Upton | May 1, 1934 |
| 1,985,762 | Bland | Dec. 25, 1934 |
| 2,025,430 | Woodward | Dec. 24, 1935 |
| 2,031,807 | Wermer | Feb. 25, 1936 |
| 2,034,400 | Kesling | Mar. 17, 1936 |
| 2,052,573 | Kesling | Sept. 1, 1936 |
| 2,062,104 | Prince | Nov. 24, 1936 |
| 2,086,723 | Maybach | July 13, 1937 |
| 2,118,978 | Maybach | May 31, 1938 |
| 2,120,104 | Livermore | June 7, 1938 |
| 2,131,157 | Almen et al. | Sept. 27, 1938 |
| 2,138,148 | Eckert | Nov. 29, 1938 |
| 2,150,408 | Wiebrecht | Mar. 14, 1939 |
| 2,163,872 | Drabin | June 27, 1939 |
| 2,234,392 | Tibbetts | Mar. 11, 1941 |
| 2,278,099 | Bennetch | Mar. 31, 1942 |
| 2,286,193 | Bennetch | June 16, 1942 |
| 2,322,479 | Schjolin | June 22, 1943 |

FOREIGN PATENTS

| Number | Country | Date |
|---|---|---|
| 294,496 | Great Britain | July 24, 1928 |